United States Patent
Beck et al.

(10) Patent No.: US 11,262,224 B2
(45) Date of Patent: Mar. 1, 2022

(54) FLOW SENSING DEVICE

(71) Applicant: Honeywell International Inc., Morris Plains, NJ (US)

(72) Inventors: Scott Edward Beck, Murphy, TX (US); Yong-Fa Wang, McKinney, TX (US); Philip C. Foster, Murphy, TX (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/946,405

(22) Filed: Jun. 19, 2020

(65) Prior Publication Data
US 2021/0396562 A1 Dec. 23, 2021

(51) Int. Cl.
| | |
|---|---|
| *G01F 1/692* | (2006.01) |
| *G01F 1/688* | (2006.01) |
| *G01F 1/684* | (2006.01) |
| *G01F 1/69* | (2006.01) |

(52) U.S. Cl.
CPC .............. *G01F 1/692* (2013.01); *G01F 1/684* (2013.01); *G01F 1/6845* (2013.01); *G01F 1/6847* (2013.01); *G01F 1/6888* (2013.01); *G01F 1/69* (2013.01)

(58) Field of Classification Search
CPC .......... G01F 1/692; G01F 1/69; G01F 1/6847; G01F 1/6845; G01F 1/6888; G01F 1/684
See application file for complete search history.

(56) References Cited

U.S. PATENT DOCUMENTS

| | | | |
|---|---|---|---|
| 4,914,742 A | | 4/1990 | Higashi et al. |
| 5,050,429 A | | 9/1991 | Nishimoto et al. |
| 5,165,292 A | * | 11/1992 | Prohaska ............... G01N 11/02 |
| | | | 210/198.2 |
| 5,533,412 A | | 7/1996 | Jerman et al. |
| 6,662,121 B1 | | 12/2003 | Oda et al. |
| 6,794,981 B2 | | 9/2004 | Padmanabhan et al. |

(Continued)

FOREIGN PATENT DOCUMENTS

| | | | | |
|---|---|---|---|---|
| DE | 102010028387 A1 | * | 11/2010 | ........... G01F 1/6842 |
| DE | 102012223210 B3 | | 4/2014 | |

(Continued)

OTHER PUBLICATIONS

Bhattacharyya, P., "Technological Journey Towards Reliable Microheater Development for MEMS Gas Sensors: A Review", IEEE Transactions on Device and Materials Reliability, Jun. 2014, pp. 589-599, vol. 14, No. 2, IEEE, US.

(Continued)

*Primary Examiner* — Ryan D Walsh
(74) *Attorney, Agent, or Firm* — Alston & Bird LLP

(57) ABSTRACT

Methods and apparatuses associated with an example flow sensing device are provided. In some examples, the flow sensing device may include a flow cap component and a sensor component. In some examples, the flow cap component may include a heating element disposed in a first layer of the flow cap component. In some examples, the sensor component may include at least one thermal sensing element disposed in a second layer of the sensor component. In some examples, the first layer and the second layer are noncoplanar. In some examples, the flow cap component may be bonded to a first surface of the sensor component to form a flow channel. In some examples, the first layer and the second layer may be noncoplanar and separated by the flow channel.

17 Claims, 9 Drawing Sheets

(56) References Cited

U.S. PATENT DOCUMENTS

| | | |
|---|---|---|
| 6,871,537 B1 | 3/2005 | Gehman et al. |
| 6,889,545 B2 | 5/2005 | Nakada et al. |
| 7,255,001 B1 | 8/2007 | Davis et al. |
| 7,278,309 B2 | 10/2007 | Dmytriw et al. |
| 7,549,206 B2 | 6/2009 | Higashi et al. |
| 7,703,339 B2 | 4/2010 | Sulouff, Jr. et al. |
| 8,033,180 B2 | 10/2011 | Morales et al. |
| 8,667,839 B2 | 3/2014 | Kimura |
| 9,581,480 B2 | 2/2017 | Tanaka et al. |
| 9,995,700 B2 | 6/2018 | Kuemin et al. |
| 10,345,130 B2 | 7/2019 | Bentley et al. |
| 10,775,217 B1 | 9/2020 | Higashi et al. |
| 2006/0000271 A1* | 1/2006 | Bork .................. G01F 1/6847 73/204.26 |
| 2012/0035866 A1* | 2/2012 | Qasimi ................ G01F 1/40 702/47 |
| 2017/0038235 A1* | 2/2017 | Zhao .................. G01F 1/6845 |
| 2018/0086629 A1* | 3/2018 | Manos ............... B81C 1/00309 |
| 2021/0116280 A1* | 4/2021 | Ali ..................... G01F 1/6847 |

FOREIGN PATENT DOCUMENTS

| | | | |
|---|---|---|---|
| DE | 102013114424 A1 | | 7/2015 |
| JP | H0674802 A | | 3/1994 |
| JP | 07218527 A | * | 8/1995 ........... G01P 9/00 |
| JP | 2007-071687 A | | 3/2007 |
| JP | 2017-219434 A | | 12/2017 |
| WO | 2009/011094 A1 | | 1/2009 |

OTHER PUBLICATIONS

Extended European search report and written opinion dated Nov. 19, 2021 for EP Application No. 21177511, 8 pages.

* cited by examiner

FLOW SENSING DEVICE

BACKGROUND

Flow sensors may be used to measure the flow rate and/or quantity of a moving liquid or gas, and may be implemented in various applications. For example, a flow sensor may be a part of a system for measuring and/or controlling the dosing of liquid or gas.

However, existing flow sensors are plagued by challenges and limitations. For example, existing flow sensors fail to provide accurate and economical measuring of low liquid flow rates using a microelectronics system with small system footprint.

BRIEF SUMMARY

In accordance with various examples of the present disclosure, an example flow sensing device may be provided.

In some examples, the example flow sensing device may comprise a flow cap component and a sensor component.

In some examples, the flow cap component may comprise a heating element disposed in a first layer of the flow cap component.

In some examples, the sensor component may comprise at least one thermal sensing element disposed in a second layer of the sensor component.

In some examples, the flow cap component may be bonded to a first surface of the sensor component to form a flow channel. In some examples, the first layer and the second layer may be noncoplanar and separated by the flow channel.

In some examples, the flow cap component may comprise a flow channel portion on a second surface of the flow cap component. In some examples, the flow channel portion and the first surface of the sensor component may form a first portion of the flow channel.

In some examples, the flow cap component may comprise a first opening and a second opening. In some examples, the first opening and the second opening may be connected to the flow channel portion on the second surface of the flow cap component.

In some examples, the flow cap component may be configured to receive a flowing media through the first opening. In some examples, the flowing media may travel through the flow channel. In some examples, the flowing media may exit the flow cap component through the second opening.

In some examples, the first portion of the flow channel may comprise a plurality of sidewalls extending along a central axis of the flow channel.

In some examples, a cross section of the first portion of the flow channel that is orthogonal to the central axis may be in a rectangular shape. In some examples, the rectangular shape may comprise at least one rounded corner or rounded edge.

In some examples, a cross section of the first portion of the flow channel that is orthogonal to the central axis may be in a triangular shape.

In some examples, the flow channel portion of the flow cap component may comprise at least one protrusion.

In some examples, a portion of a second surface of the flow cap component may be bonded to a third surface of an attachment component. In some examples, a fourth surface of the attachment component may be bonded to a portion of the first surface of the sensor component. In some examples, the flow cap component, the sensor component, and the attachment component may form a first portion of a flow channel.

In some examples, at least one thermal sensing element may comprise a first thermal sensing element and a second thermal sensing element. In some examples, the second thermal sensing element may be disposed in a downstream direction from first thermal sensing element.

In some examples, the example flow sensing device may comprise a first heat sink element disposed on a first surface of the sensor component. In some examples, the first heat sink element may be positioned in an upstream direction from the first thermal sensing element.

In some examples, the example flow sensing device may comprise a second heat sink element disposed on a first surface of the sensor component. In some examples, the second heat sink element may be positioned in a downstream direction from the second thermal sensing element.

In some examples, the flow cap component may comprise a cavity portion on a third surface of the flow cap component opposite of the second surface. In some examples, the heating element may be in contact with the cavity portion.

In some examples, the sensor component may comprise at least one plate element disposed on a third layer of the sensor component. In some examples, at least one plate element may at least partially overlap with at least one thermal sensing element.

In some examples, at least one thermal sensing element may comprise at least one thermopile element. In some examples, the sensor component may further comprise an insulator layer disposed between at least one plate element and at least one thermopile element.

In some examples, at least one thermal sensing element may comprise at least one resistor element. In some examples, the sensor component may further comprise an insulator layer disposed between at least one plate element and at least one resistor element.

In accordance with various examples of the present disclosure, an example method for manufacturing a flow sensing device may be provided.

In some examples, the example method may comprise providing a flow cap component, providing a sensor component, and bonding the flow cap component to a first surface of the sensor component to form a flow channel. In some examples, the first layer and the second layer may be noncoplanar and separated by the flow channel.

In some examples, the example method may comprise disposing a heating element in a first layer of the flow cap component. In some examples, the example method may comprise disposing at least one thermal sensing element in a second layer of the sensor component.

In some examples, the flow cap component may be bonded to the first surface of the sensor component via an attachment component.

The foregoing illustrative summary, as well as other exemplary objectives and/or advantages of the disclosure, and the manner in which the same may be accomplished, may be further explained in the following detailed description and its accompanying drawings.

BRIEF DESCRIPTION OF THE DRAWINGS

The description of the illustrative examples may be read in conjunction with the accompanying figures. It will be appreciated that, for simplicity and clarity of illustration, components and elements illustrated in the figures have not necessarily been drawn to scale, unless described otherwise.

For example, the dimensions of some of the components or elements may be exaggerated relative to other components or elements, unless described otherwise. Examples incorporating teachings of the present disclosure are shown and described with respect to the figures presented herein, in which.

DETAILED DESCRIPTION OF THE INVENTION

Figure 1A:
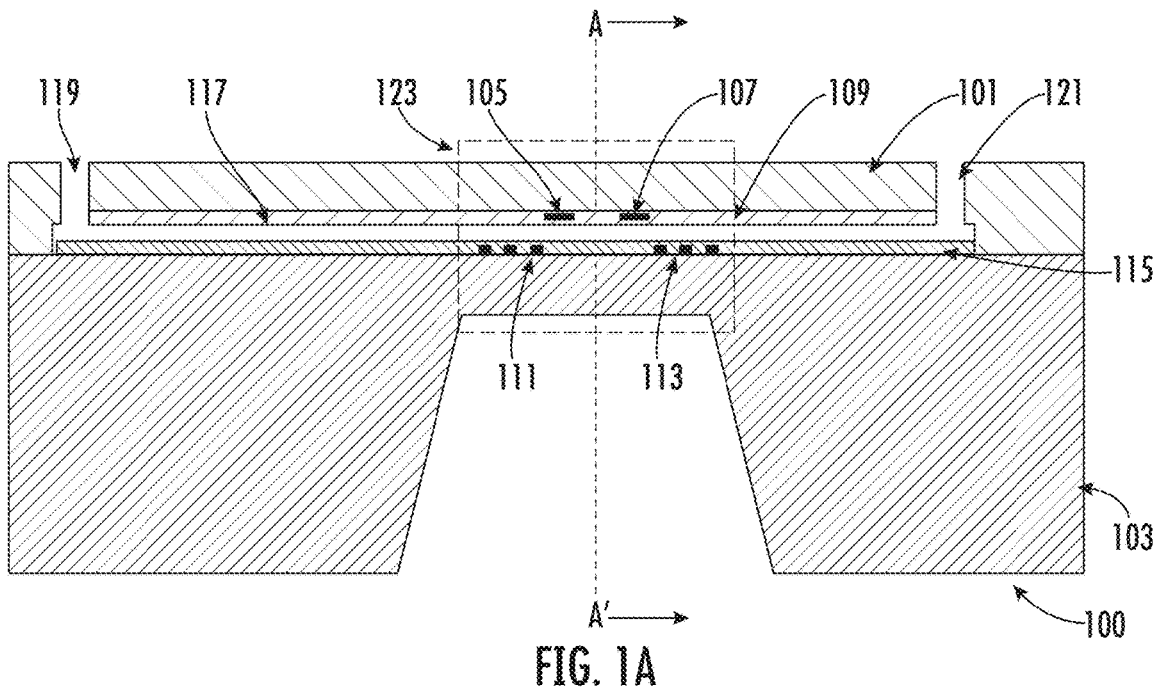
FIG. 1A illustrates an example cross sectional view of an example flow sensing device taken from the plane defined by the axis B-B' of FIG. 1B and viewed in the direction of the arrows as shown in FIG. 1B in accordance with examples of the present disclosure.

Some examples of the present disclosure will now be described more fully hereinafter with reference to the accompanying drawings, in which some, but not all examples of the disclosure are shown. Indeed, these disclosures may be embodied in many different forms and should not be construed as limited to the examples set forth herein; rather, these examples are provided so that this disclosure will satisfy applicable legal requirements. Like numbers refer to like elements throughout.

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "example" or "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

In the present disclosure, the term "flow sensing device" refers to an apparatus that may detect, measure, and/or identify flow rate(s) (including, but not limited to, linear flow velocity, nonlinear flow velocity, mass flow rate, and/or volumetric flow rate) of a flowing media or medium. In the present disclosure, the term "flowing media" refers to a substance (such as, but not limited to, liquid substance and/or gaseous substance).

For example, an example flow sensing device may be implemented in an invasive or non-invasive drug delivery system to detect, measure, and/or identify the flow rate of a flowing media associated with the invasive or non-invasive drug delivery system. In such an example, an infusion pump may be implemented to deliver substance(s) (such as, but not limited to, fluids, medications and/or nutrients) into a patient's body in an invasive drug delivery system. The substance(s) may need to be delivered in controlled amounts. As such, an example flow sensing device may be implemented in the infusion pump to detect, measure, and/or identify the flow rate of substance(s) that may be delivered to the patient.

In various examples, the flow rate of a flowing media may need to be preciously measured. Continuing from the infusion pump example above, the flow rate of the substance(s) may need to be delivered at a low rate based on the condition of the patient and/or the treatment for the patient. For example, the substance(s) may need to be delivered at less than 5 milliliters per hour. If the flow rate is not preciously measured, a patient may be over-dosed or under-dosed, which may result in injuries, casualties, and/or deaths. For example, in 2019, there were at least 21 deaths of patients in the United States that were known to be caused at least partially by over infusion of drugs in invasive drug delivery systems, which incurred at least seven million dollars cost.

To address challenges and limitations associated with measuring flow rates, various examples of the present disclosure may be provided. For example, various examples of the present disclosure may provide example flow sensing devices and example manufacturing methods for providing example flow sensing devices.

In some examples, an example flow sensing device may separate the heating element of the flow sensing device from the thermal sensing elements of the flow sensing device. For example, the heating element and the thermal sensing element may be disposed on opposite sides of the flow channel. In such examples, the thermal sensing elements may not be heated to the elevated temperature of the heating element, but instead are directly heated by the flowing media.

Additionally, or alternatively, one or more heat sink elements may be disposed upstream and/or downstream of the thermal sensing elements to, for example but not limited to, equilibrate temperatures of the flowing media outside the sensing region.

Additionally, or alternatively, one or more plate elements (such as temperature uniformity plates) may be disposed such that they at least partially overlap with the thermal sensing elements to, for example, but not limited to, improve output signal and sensitivity.

As such, some examples of the present disclosure may, for example but not limited to, improve performance, sensitivity, accuracy, and/or drift of a flow sensing device, and/or may enable measurement of flow rate in infusion pumps of an invasive drug delivery system.

Figure 1B:
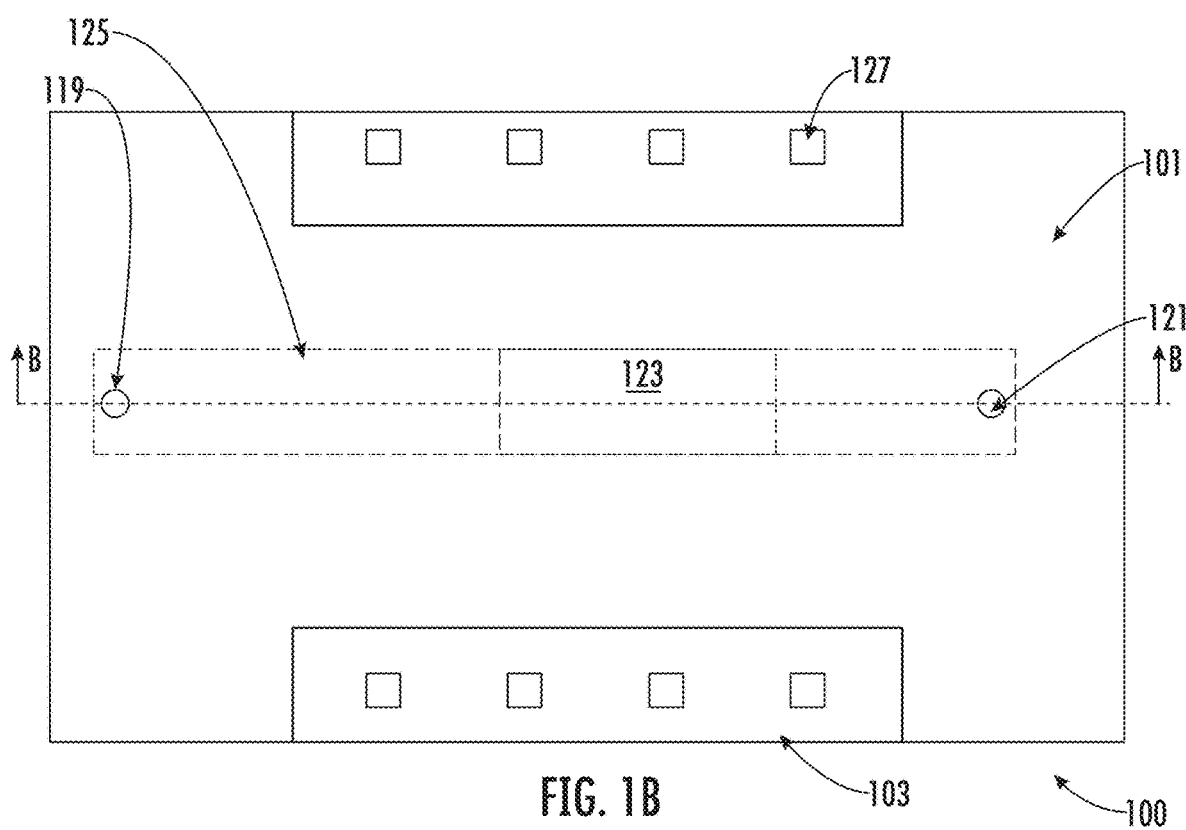
FIG. 1B illustrates an example top view of at least a portion of an example flow sensing device in accordance with examples of the present disclosure.

Referring now to FIG. 1A and FIG. 1B, example views of at least a portion of an example flow sensing device 100 are illustrated.

In particular, FIG. 1A illustrates an example cross sectional view of at least a portion of the example flow sensing device 100. FIG. 1B illustrates an example top view of at least a portion of an example flow sensing device 100. For example, the example cross sectional view of FIG. 1A may be taken from the plane defined by the axis B-B' of FIG. 1B and viewed in the direction of the arrows as shown in FIG. 1B.

Referring now to FIG. 1A, the example flow sensing device 100 may comprise a flow cap component 101 and a sensor component 103.

In the present disclosure, the term "component" refers to an article, a device, or an apparatus that may comprise one or more surfaces, portions, layers and/or elements. For example, an example component may comprise one or more substrates that may provide underlying layer(s) for the component, and may comprise one or more elements that may be disposed within and/or on top of the substrate. In the present disclosure, the term "element" refers to an article, a device, or an apparatus that may provide one or more functionalities.

For example, the flow cap component 101 may comprise material such as, but not limited to, silicon, glass, polymer, and/or plastic. Additionally, or alternatively, the sensor component 103 may comprise material such as, but not limited to, silicon, glass, polymer, and/or plastic.

In the example shown in FIG. 1A, the flow cap component 101 may comprise one or more heating elements, such as, but not limited to, a first heating element 105 and a second heating element 107.

In the present disclosure, the term "heating element" refers to an article, a device, or an apparatus that may impart heat, increase its temperature, and/or elevate the temperature of the environment surrounding and/or neighboring the heating element. For example, the first heating element 105 and/or the second heating element 107 may comprise a coil, a ribbon (including but not limited to, straight ribbon, corrugated ribbon), a plate, a wire strip, and/or a layer that may be connected to an electrical power source. When the electrical power source is turned on, electric current may flow through the coil, the ribbon, the plate, the wire strip, and/or the layer, which may in turn convert electrical energy to heat energy.

In some examples, the first heating element 105 and/or the second heating element 107 may comprise nickel-based and/or iron-based material. For example, the first heating element 105 and/or the second heating element 107 may comprise nickel iron (NiFe) alloys, which may provide high temperature coefficients of electrical resistance. For example, the first heating element 105 and/or the second heating element 107 may comprise 81% nickel (Ni) and 19% iron (Fe). Additionally, or alternatively, the first heating element 105 and/or the second heating element 107 may comprise 60% Ni and 40% Fe.

In some examples, the first heating element 105 and/or the second heating element 107 may comprise platinum and in the form of a thin film heater due to its high temperature coefficient of resistance (TCR). In some examples, copper alloys with low thermal conductivity, such as alloy 52, may also be used for the first heating element 105 and/or the second heating element 107.

While the description above provides some examples of heating elements, it is noted that the scope of the present disclosure is not limited to the description above. In some examples, an example heating element may comprise one or more additional and/or alternative element(s), one or more additional and/or alternative material(s), and/or may be in other form(s). For example, an example heating element may comprise material(s) such as, but not limited to, polysilicon, platinum (Pt), Ni, nichrome (NiCr), CrSi2. Additionally, or alternatively, an example heating element may include metals such as, but not limited to, Au, Pd, Mo, Ti, W, Hf, Zr, Cr and their silicide(s) and combinations thereof. Additionally, or alternatively, an example material for an example heating element may be selected from those that have near-zero to positive temperature coefficient of resistance.

While the description above provides an example flow cap component that comprises two heating elements, it is noted that the scope of the present disclosure is not limited to the description above. In some examples, an example flow cap component may comprise less than two or more than two heating elements.

In the example shown in FIG. 1A, the first heating element 105 and the second heating element 107 may be disposed in the first layer 109 of the flow cap component 101.

While the example shown in FIG. 1A illustrates two heating elements, it is noted that an example of the present disclosure may comprise a single heating element.

Further, in various examples of the present disclosure, the flow cap component 101 may be an integral part of the example flow sensing device 100. For example, the example flow sensing device 100 may be etched to form a flow channel (as described further herein), and the flow cap component 101 may refer to a part of the example flow sensing device 100 that is above the flow channel.

In some examples, the first layer 109 of the flow cap component 101 may comprise material such as, not limited to, silicon nitride (Si3N4). For example, the first layer 109 may be an encapsulating layer. In some examples, the encapsulating layer may comprise other material(s), including but not limited to, silicon nitride, silicon oxide, silicon oxynitride, a polymer, or other electrically insulating thin films.

Additionally, or alternatively, the flow cap component 101 and the sensor component 103 may comprise material that may have similar thermal coefficient of expansion (TCE).

In some examples, the first heating element 105 and/or the second heating element 107 may be electronically coupled to one or more other elements (for example, an electrical power source) based on techniques such as, but not limited to, through-glass via (TGV), through-silicon via (TSV), and/or aerosol or ink jet printing. Additionally, or alternatively, the first heating element 105 and/or the second heating element 107 may be electronically coupled to one or more other elements through other means.

Referring to FIG. 1A, the sensor component 103 may comprise one or more thermal sensing elements, such as, but not limited to, a first thermal sensing element 111 and a second thermal sensing element 113.

In the present disclosure, the term "thermal sensing element" refers to an article, a device, or an apparatus that may detect, measure, and/or identify the thermal level (for example, temperature) of the environment surrounding and/or neighboring the thermal sensing element. For example, the first thermal sensing element 111 and/or the second thermal sensing element 113 may comprise one or more thermopile element(s). In such an example, an example thermopile element may comprise one or more thermocouples connected in series or in parallel, which may detect, measure, and/or identify thermal energy, and may convert thermal energy into electrical energy and/or generate one or more electric signals based on the detected/measured/identified thermal energy.

While the description above provides some examples of thermal sensing elements, it is noted that the scope of the present disclosure is not limited to the description above. In some examples, an example thermal sensing element may comprise one or more additional and/or alternative element(s), one or more additional and/or alternative material(s), and/or may be in other form(s). For example, an example thermal sensing element may comprise at least one temperature sensing circuit, such as, but not limited to, resistors in a Wheatstone bridge circuit, or temperature sensitive diodes.

In the example of a Wheatstone bridge circuit, two resistor branches may be provided, and each resistor branch may comprise two resistor elements. As temperature may affect the electrical resistance of the resistor element, an example thermal sensing element may detect, measure, and/or identify the resistance change between the two resistor branches to determine the corresponding thermal energy.

While the description above provides an example sensor component that comprises two thermal sensing elements, it is noted that the scope of the present disclosure is not limited to the description above. In some examples, an example sensor component may comprise less than two or more than two thermal sensing elements.

In the example shown in FIG. 1A, the first thermal sensing element 111 and the second thermal sensing element 113 may be disposed in the second layer 115 of the sensor component 103. In some examples, the second layer 115 of the sensor component 103 may comprise material such as, not limited to, silicon nitride (Si3N4). Additionally, or alternatively, the second layer 115 of the sensor component 103 may comprise other material(s), including but not limited to, silicon nitride, silicon oxide, silicon oxynitride, a polymer, or other electrically insulating thin films.

In some examples, the second layer 115 may be an encapsulating layer that may protect the thermal sensing elements, which may comprise metals that may be corroded by moisture and other chemicals. In some examples, the second layer 115 may be electrically insulating.

In some examples, the first thermal sensing element 111 and/or the second thermal sensing element 113 may be electronically coupled to one or more other elements (for example, an electrical power source, a processor) based on techniques such as, but not limited to, through-glass via (TGV), through-silicon via (TSV), and/or aerosol or ink jet printing. Additionally, or alternatively, the first thermal sensing element 111 and/or the second thermal sensing element 113 may be electronically coupled to one or more other elements through other means.

In some examples, the first layer 109 of the flow cap component 101 and the second layer 115 of the sensor component 103 may be noncoplanar. In other words, the first layer 109 of the flow cap component 101 may not occupy the same plane as the second layer 115 of the sensor component 103.

As described above, the first layer 109 of the flow cap component 101 may comprise a heating element disposed within, and the second layer 115 of the sensor component 103 may comprise at least one thermal sensing element disposed within. Because the first layer 109 of the flow cap component 101 and the second layer 115 of the sensor component 103 may be noncoplanar, the heating element may be noncoplanar with at least one thermal sensing element. In the example shown in FIG. 1A, the first heating element 105 and the second heating element 107 may be coplanar and occupy a first plane, and the first thermal sensing element 111 and the second thermal sensing element 113 may be coplanar and occupy a second plane. The first plane may be parallel to the second plane.

As such, various examples of the present disclosure may separate the first heating element 105 and/or the second heating element 107 from the first thermal sensing element 111 and/or the second thermal sensing element 113. As such, the first thermal sensing element 111 and/or the second thermal sensing element 113 may not be heated to the elevated temperature of the first heating element 105 and/or the second heating element 107, and may be directly heated by the flowing media received by the flow sensing device 100 (details of which are described herein).

Referring back to FIG. 1A, in some examples, the flow cap component 101 may be bonded to a first surface of the sensor component 103 for form a flow channel. For example, the flow cap component 101 may be bonded to the first surface of the sensor component 103 via an adhesive material. Additionally, or alternatively, other bonding mechanisms may be used to bond the flow cap component 101 to the sensor component 103, including but not limited to, oxide glass sealing, anodic bonding, thermoelectric bonding, fusion bonding, metal brazing, direct bonding, and/or the like.

In some examples, the flow cap component 101 may comprise a flow channel portion 117 on a second surface of the flow cap component 101. In the example shown in FIG. 1A, the surface of the flow channel portion 117 may be recessed from the surrounding surface of the flow cap component 101. As described above, the flow cap component 101 may be bonded to a first surface of the sensor component 103. In some examples, the flow channel portion 117 of the flow cap component 101 and the first surface of the sensor component 103 may form at least a first portion of a flow channel.

In the present disclosure, the term "flow channel" refers to a passageway where flowing media may travel. In some examples, a flow channel may be the void created within the flow cap component 101 and the area on the sensor component 103 bounded by the void in the flow cap component 101 when these are placed in intimate contact. As will be described in detail further herein, an example flow channel of the present disclosure may be defined/formed by and/or comprise a plurality of sidewalls.

In some examples, the first layer 109 of the flow cap component 101 and the second layer 115 of the sensor component 103 may be separated by the flow channel. As such, various examples of the present disclosure may separate the first heating element 105 and/or the second heating element 107 from the first thermal sensing element 111 and/or the second thermal sensing element 113, and the first thermal sensing element 111 and/or the second thermal sensing element 113 may not be heated to the elevated temperature of the first heating element 105 and/or the second heating element 107.

In the example shown in FIG. 1A, the flow cap component 101 may comprise a first opening 119 and a second opening 121. In some examples, the first opening 119 and the second opening 121 may be connected to the flow channel portion 117 on the second surface of the flow cap component.

In some examples, the flow cap component 101 may be configured to receive a flowing media through the first opening 119. In some examples, the flowing media may travel through the flow channel, and may exit the flow cap component 101 through the second opening 121.

In some examples, the flowing media may travel through a sensing region 123 that may comprise the first heating element 105, the second heating element 107, the first thermal sensing element 111 and the second thermal sensing element 113. For example, the first thermal sensing element 111 may be positioned in an upstream direction from the first heating element 105 and the second heating element 107. The second thermal sensing element 113 may be positioned in a downstream direction from the first heating element 105 and the second heating element 107. In such examples, the first thermal sensing element 111 may detect a first temperature of the flowing media. Subsequently, the flowing media may be heated by the first heating element 105 and/or the second heating element 107, which may increase the temperature of the flowing media by a predetermined amount.

Subsequently, the second thermal sensing element 113 may detect a second temperature of the flowing media. As the flow rate of the flowing media increases, more heat may be lost as the flowing media travels from the first heating element 105 and/or the second heating element 107 to the second thermal sensing element 113. By comparing the difference between the first temperature and the second temperature with the predetermined amount, a flow rate of the flowing media may be calculated.

Referring now to FIG. 1B, an example top view of the at least a portion of an example flow sensing device 100 is illustrated.

In the example shown in FIG. 1B, the flow cap component 101 may be disposed on the first surface of the sensor component 103. As described above, the first opening 119 of the flow cap component 101 may receive an example flowing media of the flow sensing device 100. The flowing media may travel through the flow channel 125 (including the sensing region 123), and may exit the flow sensing device 100 through the second opening 121 of the flow cap component 101.

In some examples, the sensor component 103 may comprise one or more bonding pads (for example, bonding pad 127). In the example shown in FIG. 1B, the flow cap component 101 may isolate the bonding pads from the flow channel 125, to protect them from the liquid and to make the bonding pads accessible for wire bonding.

Figure 1C:
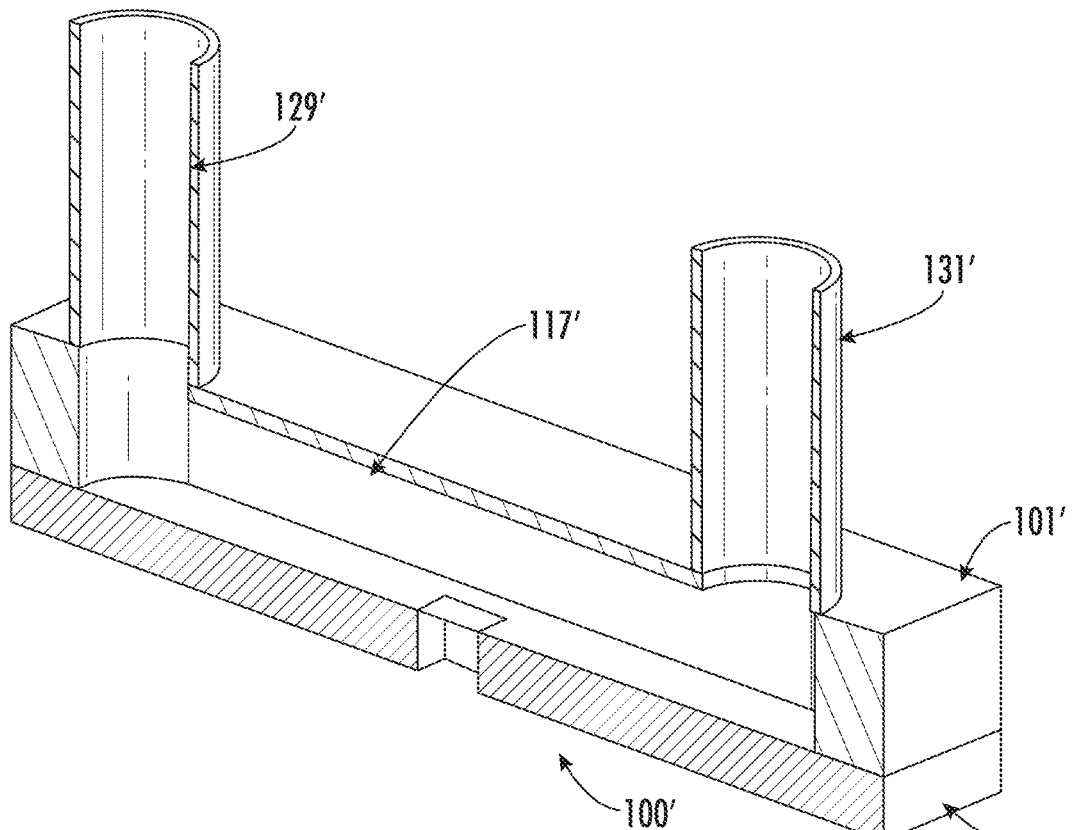
FIG. 1C illustrates an example prospective cross sectional view of at least a portion of an alternative flow sensing device that is taken from, for example, a plane similar to the plane defined by the axis B-B' of FIG. 1B and viewed in a direction similar to the direction of the arrows as shown in FIG. 1B in accordance with examples of the present disclosure.

Referring now to FIG. 1C, an example perspective cross sectional view of an example flow sensing device 100' is illustrated. For example, the example cross sectional view of FIG. 1C may be taken from a plane similar to the plane defined by the axis B-B' of FIG. 1B relative to the flow sensing device and viewed in the direction of the arrows as shown in FIG. 1B. In this example, the flow sensing device 100' illustrated in FIG. 1C is shown as an alternative example to the flow sensing device 100 illustrated in FIG. 1A and FIG. 1B.

In particular, the example flow sensing device 100' may include an example flow cap component 101' and an example sensor component 103', similar to the example flow cap component 101 and the example sensor component 103 described above. FIG. 1C also illustrates an example flow channel portion 117' that may comprise an recess to create a flow channel. In the example shown in FIG. 1C, a first tube 129' and a second tube 131' may be connected to the flow channel, such that an example flowing media may enter the example flow sensing device 100' through one of the tubes, travel through the flow channel, and exit the example flow sensing device 100' from the other tube. In some examples, the first tube 129' and/or the second tube 131' may comprise material such as, but not limited to, silicon, glass, polymer, and/or plastic.

Figure 2:
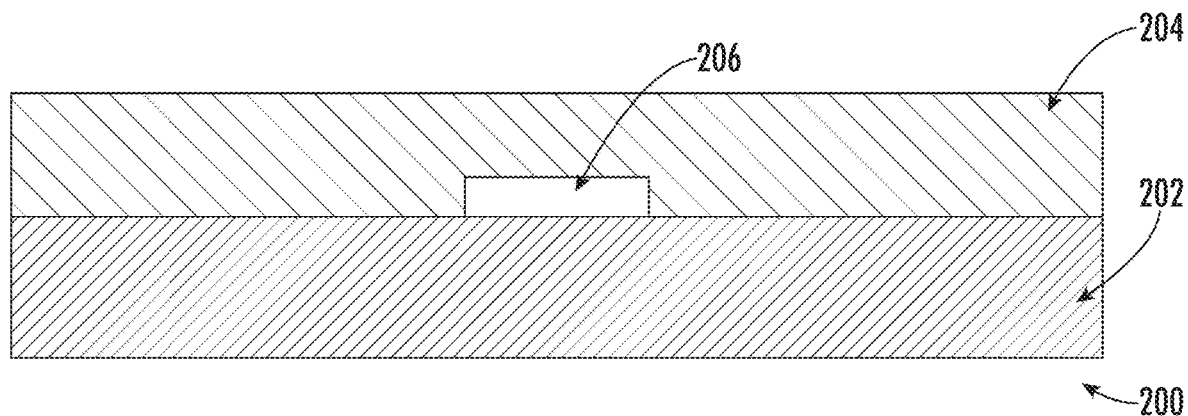
FIG. 2 illustrates an example cross sectional view of at least a portion of an example flow sensing device that is taken from, for example, a plane similar to the plane defined by the axis A-A' of FIG. 1A and viewed in a direction similar to the direction of the arrows as shown in FIG. 1A in accordance with examples of the present disclosure in accordance with examples of the present disclosure.
Figure 3:
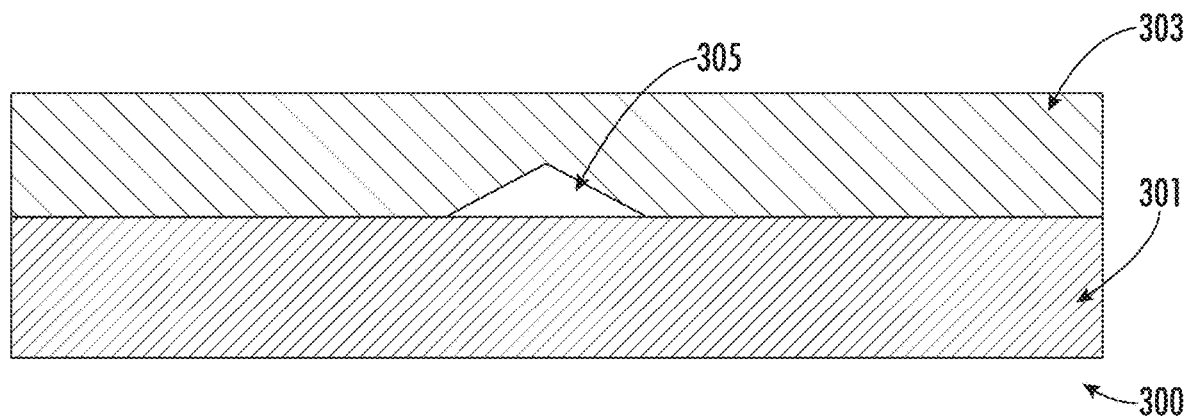
FIG. 3 illustrates an example cross sectional view of at least a portion of an example flow sensing device that is taken from, for example, a plane similar to the plane defined by the axis A-A' of FIG. 1A and viewed in a direction similar to the direction of the arrows as shown in FIG. 1A in accordance with examples of the present disclosure in accordance with examples of the present disclosure.
Figure 4:
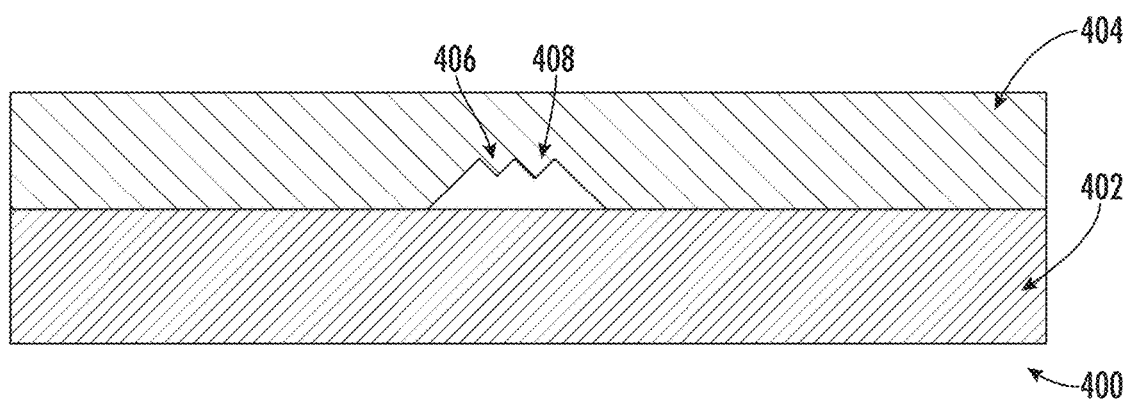
FIG. 4 illustrates an example cross sectional view of at least a portion of an example flow sensing device that is taken from, for example, a plane similar to the plane defined by the axis A-A' of FIG. 1A and viewed in a direction similar to the direction of the arrows as shown in FIG. 1A in accordance with examples of the present disclosure in accordance with examples of the present disclosure.

Referring back to FIG. 1A, as described above, the first portion of the flow channel may comprise a plurality of sidewalls. In the example shown in FIG. 1A, the plurality of sidewalls may extend along a central axis of the flow channel. In various examples of the present disclosure, cross sections (along the axis A-A' as shown in FIG. 1A) of the first portion of the flow channel viewed from the direction as shown in the arrows in FIG. 1A may comprise various shapes. Referring now to FIG. 2, FIG. 3 and FIG. 4, examples shapes of example cross sections of example first portions of example flow channels are provided.

In various examples of the present disclosure, example dimensions of example cross sections of example flow channels may be in the microns to hundreds of microns in height and tens of microns to hundreds of microns in width.

In various examples of the present disclosure, example flow channels may be greater than one hundred microns in length.

While the description above provides example dimensions of example flow channels, it is noted that the scope of the present disclosure is not limited to the description above. In some examples, example dimensions of example flow channels may have other values.

Referring now to FIG. 2, an example cross section of an example flow sensing device 200 is illustrated. In particular, the example cross sectional view shown in FIG. 2 may be taken from, for example, a plane similar to the plane defined by the axis A-A' of FIG. 1A relative to the flow sensing device and viewed in a direction similar to the direction of the arrows as shown in FIG. 1A.

In the example shown in FIG. 2, the example flow sensing device 200 may comprise a sensor component 202 and a flow cap component 204, similar to the sensor component 103 and the flow cap component 101 described above in connection with FIG. 1A and FIG. 1B.

For example, the flow cap component 204 may comprise material such as, but not limited to, silicon, glass, polymer, and/or plastic. Additionally, or alternatively, the sensor component 202 may comprise material such as, but not limited to, silicon, glass, polymer, and/or plastic.

For example, the flow cap component 204 may comprise a flow channel portion on a second surface of the flow cap component 204. The flow cap component 204 may be bonded to a first surface of the sensor component 202. In some examples, the flow channel portion of the flow cap component 204 and the first surface of the sensor component 202 may form at least a first portion of a flow channel.

In some examples, an example cross section 206 of the first portion of the flow channel that is orthogonal to the central axis of the flow channel may be in a rectangular shape. For example, the flow channel portion of the flow cap component 204 may provide three sidewalls for the flow channel, where one of the sidewalls may be in an orthogonal arrangement with the other two sidewalls.

In some examples, the rectangular shape of the example cross section 206 of the first portion of the flow channel may comprise at least one rounded corner or rounded edge. For example, the flow channel portion of the flow cap component 204 may provide curved sidewall(s) for the flow channel. In some examples, at least one rounded corner or rounded edge may reduce bubble formations within the flow channel, and/or may reduce the impact on reading inaccuracies due to turbulence of flowing media.

Referring now to FIG. 3, an example cross section of an example flow sensing device 300 is illustrated. In particular, the example cross sectional view shown in FIG. 3 may be taken from, for example, a plane similar to the plane defined by the axis A-A' of FIG. 1A relative to the flow sensing device and viewed in a direction similar to the direction of the arrows as shown in FIG. 1A.

In the example shown in FIG. 3, the example flow sensing device 300 may comprise a sensor component 301 and a flow cap component 303, similar to the sensor component 103 and the flow cap component 101 described above in connection with FIG. 1A and FIG. 1B.

For example, the flow cap component 303 may comprise material such as, but not limited to, silicon, glass, polymer, and/or plastic. Additionally, or alternatively, the sensor component 301 may comprise material such as, but not limited to, silicon, glass, polymer, and/or plastic.

For example, the flow cap component 303 may comprise a flow channel portion on a second surface of the flow cap component 303. The flow cap component 303 may be bonded to a first surface of the sensor component 301. In some examples, the flow channel portion of the flow cap component 303 and the first surface of the sensor component 301 may form at least a first portion of a flow channel.

In some examples, an example cross section 305 of the first portion of the flow channel that is orthogonal to the central axis of the flow channel may be in a triangular shape. For example, the flow channel portion of the flow cap component 303 may provide two sidewalls for the flow channel that may be in an inverted "V" shape in the cross section, which may form two edges of the triangular shape.

In some examples, the triangular shape of the example cross section 305 of the first portion of the flow channel may comprise at least one rounded corner or rounded edge. For example, the flow channel portion of the flow cap component 303 may provide curved sidewall(s) for the flow channel. In some examples, at least one rounded corner or rounded edge may reduce bubble formations within the flow channel, and/or may reduce the impact on reading inaccuracies due to turbulence of flowing media.

Referring now to FIG. 4, an example cross section of an example flow sensing device 400 is illustrated. In particular, the example cross sectional view shown in FIG. 4 may be taken from, for example, a plane similar to the plane defined by the axis A-A' of FIG. 1A relative to the flow sensing device and viewed in a direction similar to the direction of the arrows as shown in FIG. 1A.

In the example shown in FIG. 4, the example flow sensing device 400 may comprise a sensor component 402 and a flow cap component 404, similar to the sensor component 103 and the flow cap component 101 described above in connection with FIG. 1A and FIG. 1B.

For example, the flow cap component 404 may comprise material such as, but not limited to, silicon, glass, polymer, and/or plastic. Additionally, or alternatively, the sensor component 402 may comprise material such as, but not limited to, silicon, glass, polymer, and/or plastic.

For example, the flow cap component 404 may comprise a flow channel portion on a second surface of the flow cap component 404. The flow cap component 404 may be bonded to a first surface of the sensor component 402. In some examples, the flow channel portion of the flow cap component 404 and the first surface of the sensor component 402 may form at least a first portion of a flow channel.

In some examples, the flow channel portion of the flow cap component 404 may comprise at least one protrusion. In the example shown in FIG. 4, the flow channel portion of the flow cap component may comprise a first protrusion 406 and a second protrusion 408, and cross sections of the first protrusion 406 and the second protrusion 408 (that is orthogonal to the central axis of the flow channel) may be in a triangular shape. In some examples, the first protrusion 406 and/or the second protrusion 408 may reduce bubble formations within the flow channel, and/or may reduce the impact on reading inaccuracies due to turbulence of flowing media.

While the description above provides an example shape of an example protrusion of an example flow channel portion, it is noted that the scope of the present disclosure is not limited to the description above. In some examples, an example protrusion of an example flow channel portion may comprise one or more additional and/or alternative shapes. For example, an example cross section of an example protrusion (that is orthogonal to the central axis of the flow channel) may be in a square shape, a sawtooth shape, and/or the like.

Figure 5:
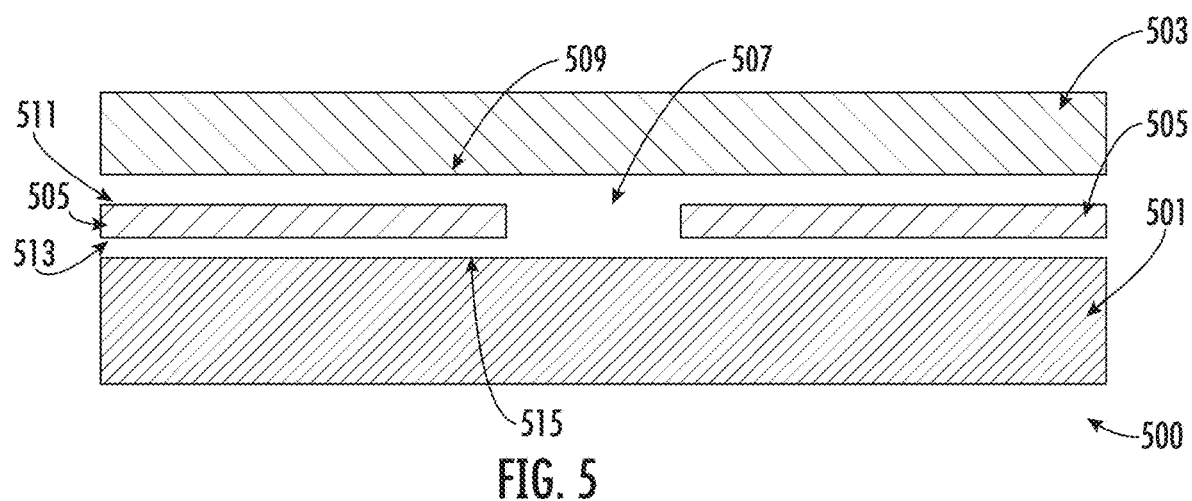
FIG. 5 illustrates an example exploded, cross sectional view of at least a portion of an example flow sensing device that is taken from, that is taken from, for example, a plane similar to the plane defined by the axis A-A' of FIG. 1A and viewed in a direction similar to the direction of the arrows as shown in FIG. 1A in accordance with examples of the present disclosure in accordance with examples of the present disclosure.

While the description above provides example shapes of cross sections of the first portion of the flow channel, it is noted that the scope of the present disclosure is not limited to the description above. In some examples, an example cross section of the first portion of the flow channel may comprise one or more additional and/or alternative shapes, and/or the first portion of the flow channel may be formed in additional and/or alternative ways. Referring now to FIG. 5, an example way of forming the first portion of the flow channel is illustrated.

In the example shown in FIG. 5, an example exploded, cross sectional view of an example flow sensing device 500 is illustrated. In particular, the example exploded, cross sectional view shown in FIG. 5 may be taken from, for example, a plane similar to the plane defined by the axis A-A' of FIG. 1A relative to the flow sensing device and viewed in a direction similar to the direction of the arrows as shown in FIG. 1A.

In the example shown in FIG. 5, the example flow sensing device 500 may comprise a sensor component 501 and a flow cap component 503, similar to the sensor component 103 and the flow cap component 101 described above in connection with FIG. 1A and FIG. 1B. For example, the flow cap component 503 may comprise material such as, but not limited to, silicon, glass, polymer, and/or plastic. Additionally, or alternatively, the sensor component 501 may comprise material such as, but not limited to, silicon, glass, polymer, and/or plastic.

In the example shown in FIG. 5, the flow cap component 503 may not comprise a flow channel portion. The flow cap component 503 may be bonded to the sensor component 501 through an attachment component 505.

For example, the attachment component 505 may comprise one or more layers of adhesive materials. As an example, materials belonging to families of adhesives may include epoxies, polyamides, silicones, and others. In some examples, the flow cap component may be fabricated from silicon, and the attachment component 505 may comprise a silicon-to-silicon bond. In some examples, the flow cap component may be fabricated from glass, and the attachment component 505 may comprise a glass to silicon bond. Additionally, or alternatively, the attachment component 505 may comprise polyimides, SU-8, patternable dry film resist, and/or photo patternable adhesives.

In the example shown in FIG. 5, the flow cap component 503, the sensor component 501, and the attachment component 505 may form a first portion of a flow channel 507. For example, a portion of a second surface 509 of the flow cap component 503 may be bonded to a third surface 511 of an attachment component 505. A fourth surface 513 of the attachment component 505 may be bonded to a portion of the first surface 515 of the sensor component 501. In such examples, at least a portion of the second surface 509 of the flow cap component 503 may not be bonded to the attachment component 505 and the sensor component 501. Additionally, or alternatively, at least a portion of the first surface 515 of the sensor component 501 may not be bonded to the attachment component 505 and the flow cap component 503. These unbonded portions of the first surface 515 of the sensor component 501 and/or the second surface 509 of the flow cap component 503 may provide sidewalls for the flow channel 507.

Figure 6A:
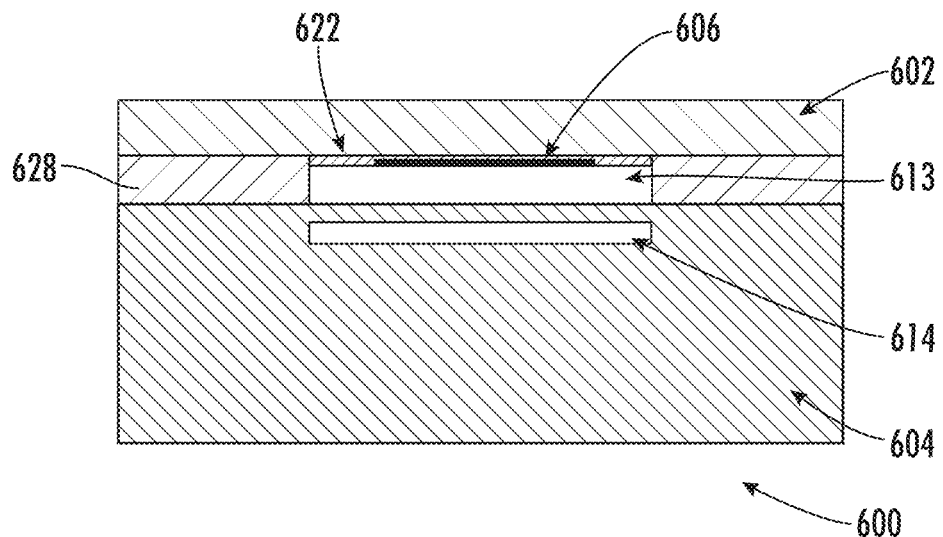
FIG. 6A illustrates an example cross sectional view of at least a portion of an example flow sensing device that is taken from, for example, the plane defined by the axis C-C' of FIG. 6B and viewed in the direction of the arrows as shown in FIG. 6B in accordance with examples of the present disclosure.
Figure 6B:
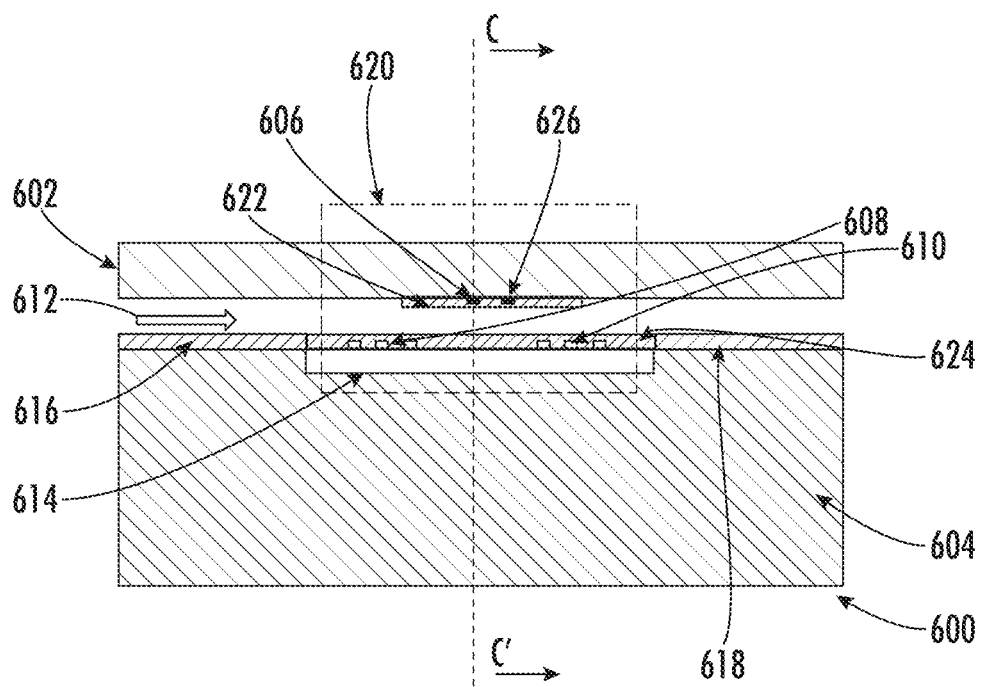
FIG. 6B illustrates an example cross sectional view of at least a portion of an example flow sensing device that is taken from, for example, a plane similar to the plane defined by the axis B-B' of FIG. 1B and viewed in a direction similar to the direction of the arrows as shown in FIG. 1B in accordance with examples of the present disclosure.

Referring now to FIG. 6A and FIG. 6B, example views of an example flow sensing device 600 in accordance with examples of the present disclosure are illustrated.

In particular, FIG. 6A illustrates an example cross sectional view of at least a portion of the example flow sensing device 600. FIG. 6B illustrates another example cross sectional view of at least a portion of an example flow sensing device 600 in accordance with examples of the present disclosure. For example, the example cross sectional view of FIG. 6A may be taken from the plane defined by the axis C-C' of FIG. 6B and viewed in the direction of the arrows as shown in FIG. 6B. The example cross sectional view of FIG. 6B may be taken from, for example, a plane similar to the plane defined by the axis B-B' of FIG. 1B relative to the flow sensing device and viewed in a direction similar to the direction of the arrows as shown in FIG. 1B. In this example, the flow sensing device 600 illustrated in FIG. 6A and FIG. 6B is shown as an alternative example to the flow sensing device 100 illustrated in FIG. 1A and FIG. 1B.

Referring now to FIG. 6A, the example flow sensing device 600 may comprise a flow cap component 602 and a sensor component 604, similar to the flow cap component 101 and the sensor component 103 described above in connection with FIG. 1A and FIG. 1B.

For example, the flow cap component 602 may comprise material such as, but not limited to, silicon, glass, polymer, and/or plastic. Additionally, or alternatively, the sensor component 604 may comprise material such as, but not limited to, silicon, glass, polymer, and/or plastic.

For example, the flow cap component 602 may comprise one or more heating elements, such as, but not limited to, a first heating element 606. Similar to the first heating element 105 and/or the second heating element 107 described above in connection with FIG. 1A and FIG. 1B, the first heating element 606 may comprise a coil, a ribbon (including but not limited to, straight ribbon, corrugated ribbon), a plate, a wire strip, and/or a layer that may be connected to an electrical power source. When the electrical power source is turned on, electric current may flow through the coil, the ribbon, the plate, the wire strip, and/or the layer, which may in turn convert electrical energy to heat energy.

In some examples, the first heating element 606 may comprise nickel-based and/or iron-based material. For example, the first heating element 606 may comprise nickel iron (NiFe) alloys, which may provide high temperature coefficients of electrical resistance.

In some examples, the first heating element 606 may comprise platinum. For example, the platinum material may be deposited in a binary thin film system such as, but not limited to, Titanium/Platinum, Tantalum/Platinum, or Chromium Oxide/Platinum. Additionally, or alternatively, platinum material may be deposited in a single layer. In some examples, platinum may be the material for the first heating element 606 and may not be the adhesion material. In some examples, Pt and other heater materials may be deposited on an adhesion layer such as Ti, Ta, $Cr_2O_3$, TaN, and the like.

While the description above provides some examples of heating elements, it is noted that the scope of the present disclosure is not limited to the description above. In some examples, an example heating element may comprise one or more additional and/or alternative element(s), one or more additional and/or alternative material(s), and/or may be in other form(s).

In the example shown in FIG. 6A, the first heating element 606 may be disposed in the first layer 622 of the flow cap component 602. In some examples, the first layer 622 of the flow cap component 602 may comprise material such as, not limited to, silicon nitride ($Si_3N_4$). Additionally, or alternatively, the first layer 622 of the flow cap component 602 may comprise other material(s), including but not limited to, silicon oxide, silicon nitride, silicon oxynitride, and/or the like.

In some examples, the flow cap component 602, the sensor component 604, and the interposer material 628 may have similar Temperature Coefficient of Expansions (TCEs). In some examples, the flow cap component 602 and the sensor component 604 may have similar TCEs.

In some examples, the first heating element 606 may be electronically coupled to one or more other elements (for example, an electrical power source) based on techniques such as, but not limited to, through-glass via (TGV), through-silicon via (TSV), and/or aerosol or ink jet printing. Additionally, or alternatively, the first heating element 606 may be electronically coupled to one or more other elements through other means.

Referring back to FIG. 6A, in some examples, the flow cap component 602 may be bonded to a first surface of the sensor component 604. For example, the flow cap component 602 may be bonded to the first surface of the sensor component 604 via an adhesive material. In some examples, a polymer (such as SU-8) or polyimide, and/or a glass wafer, and/or a silicon wafer may be used as an interposer. Additionally, or alternatively, a polymer (such as SU-8 or polyimide) may also be used as an adhesion layer. Additionally, or alternatively, other bonding mechanisms may be used to bond the flow cap component 602 to the sensor component 604, including but not limited to, oxide glass sealing, metal brazing, anodic bonding, direct bonding, and/or the like.

In some examples, the example flow sensing device 600 may comprise a flow channel 613, similar to the example flow channels described above.

Referring now to FIG. 6B, the sensor component 604 may comprise one or more thermal sensing elements, such as, but not limited to, a first thermal sensing element 608 and a second thermal sensing element 610, similar to the first thermal sensing element 111 and the second thermal sensing element 113 described above in connection with FIG. 1A and FIG. 1B. In some examples, the first thermal sensing element 608 and the second thermal sensing element 610 represent resistors.

For example, the first thermal sensing element 608 and/or the second thermal sensing element 610 may comprise one or more thermopile element(s). In such an example, an example thermopile element may comprise one or more thermocouples connected in series or in parallel, which may detect, measure, and/or identify thermal energy, and may convert thermal energy into electrical energy and/or generate one or more electric signals based on the detected/measured/identified thermal energy.

While the description above provides some examples of thermal sensing elements, it is noted that the scope of the present disclosure is not limited to the description above. In some examples, an example thermal sensing element may comprise one or more additional and/or alternative element(s), one or more additional and/or alternative material(s), and/or may be in other form(s). For example, an example thermal sensing element may comprise at least one temperature sensing circuit, such as, but not limited to, resistors in a Wheatstone bridge circuit, or temperature sensitive diodes.

While the description above provides an example sensor component that comprises two thermal sensing elements, it is noted that the scope of the present disclosure is not limited to the description above. In some examples, an example sensor component may comprise less than two or more than two thermal sensing elements.

In the example shown in FIG. 6B, the first thermal sensing element 608 and the second thermal sensing element 610 may be disposed in the second layer 624 of the sensor component 604. In some examples, the second layer 624 of the sensor component 604 may comprise material such as, not limited to, silicon nitride. Additionally, or alternatively, the second layer 624 of the sensor component 604 may comprise other material(s), including but not limited to, silicon nitride, silicon oxide, silicon oxynitride, a polymer, or other electrically insulating thin films. Additionally, or alternatively, the second layer 624 of the sensor component 604 may comprise material such as plasma enhanced chemical vapor deposition (PECVD) silicon nitride. In some examples, the first thermal sensing element 608 and/or the second thermal sensing element 610 may be electronically coupled to one or more other elements (for example, an electrical power source, a processor) based on techniques such as, but not limited to, through-glass via (TGV), through-silicon via (TSV), and/or aerosol or ink jet printing. Additionally, or alternatively, the first thermal sensing element 608 and/or the second thermal sensing element 610 may be electronically coupled to one or more other elements through other means.

In some examples, the first layer 622 of the flow cap component 602 and the second layer 624 of the sensor component 604 may be noncoplanar. In other words, the first layer 622 of the flow cap component 602 may not occupy the same plane as the second layer 624 of the sensor component 604.

In some examples, the sensor component 604 may comprise a cavity portion 614. In the example shown in FIG. 6B, the cavity portion 614 may be positioned under the second layer 624 of the sensor component 604. In some examples, the first thermal sensing element 608 and/or the second thermal sensing element 610 may be in contact with the cavity portion 614. In some examples, the cavity portion 614 may reduce and/or eliminate temperature interference on the first thermal sensing element 608 and/or the second thermal sensing element 610 that may be caused by the sensor component 604.

Referring back to FIG. 6B, the second thermal sensing element 610 may be disposed in a downstream direction of the travel path 612 of the flowing media from the first thermal sensing element 608. The flowing media may travel through a sensing region 620 that may comprise the first heating element 606, a second heating element 626, the first thermal sensing element 608 and the second thermal sensing element 610 (similar to the sensing region 123 described above in connection with FIG. 1A and FIG. 1B).

In some examples, one or more heat sink element may be disposed outside of the sensing region 620. In the present disclosure, the term "heat sink element" refers to an article, a device, or an apparatus that may disperse and/or transfer heat from another object. For example, the heat sink element may remove heat from the flowing media (for example, a flowing liquid). In accordance with various examples of the present discourse, a heat sink element may comprise various materials and/or in various forms.

For example, an example heat sink element in accordance with examples of the present disclosure may comprise metal material, including but not limited to, aluminum (Al), gold (Au), aluminum-gold (Al—Au), aluminum-gold-silicon (Al—Cu—Si), silver (Ag), nickel (Ni), tungsten (W), platinum (Pt), chromium (Cr), nickel-iron alloy (NiFe), Titanium (Ti), silicon (Si), or polysilicon and/or tungsten-titanium (TiW). Additionally, or alternatively, an example heat sink element in accordance with examples of the present disclosure may comprise silicide. Additionally, or alternatively, an example heat sink element in accordance with examples of the present disclosure may comprise one or more micromachined areas that may carry thermally conductive substance (for example, air and/or thermally conductive fluids).

Additionally, or alternatively, an example heat sink element in accordance with examples of the present disclosure may comprise an electrically insulating surface layer that may comprise material such as, but not limited to, intrinsic polysilicon, graphite, graphene, diamond, aluminum nitride, silicide, beryllia, and/or the like.

While the description above provides example materials and forms of example heat sink elements, it is noted that the scope of the present disclosure is not limited to the description above. In some examples, an example heat sink element may comprise one or more additional and/or alternative material(s) and/or may be in one or more additional and/or alternative form(s).

Referring back to FIG. 6B, in some examples, the flow sensing device 600 may comprise a first heat sink element 616 disposed on the first surface of the sensor component 604. In some examples, the first heat sink element 616 may be disposed in an upstream direction of the travel path 612 of the flowing media from the first thermal sensing element 608.

In some examples, the flow sensing device 600 may comprise a second heat sink element 618 disposed on the first surface of the sensor component 604. In some examples, the second heat sink element 618 may be disposed in the downstream direction of the travel path 612 of the flowing media from the second thermal sensing element 610.

As described above, an example heat sink element may disperse and/or transfer heat from another object. For example, the first heat sink element 616 and/or the second heat sink element 618 may disperse and/or transfer heat from the flowing media as the flowing media travels through the flow channel of the flow sensing device 600. In some examples, the first heat sink element 616 and/or the second heat sink element 618 may cause adjustment of the temperature of the flowing media, such that the temperature of the flowing media entering the flow sensing device 600 is the same as the temperature of the flowing media existing the flow sensing device 600. In such examples, the temperature impact on the flowing media (for example, substance in an infusion pump) caused by the flow sensing device 600 may be reduced and/or eliminated.

Figure 7:
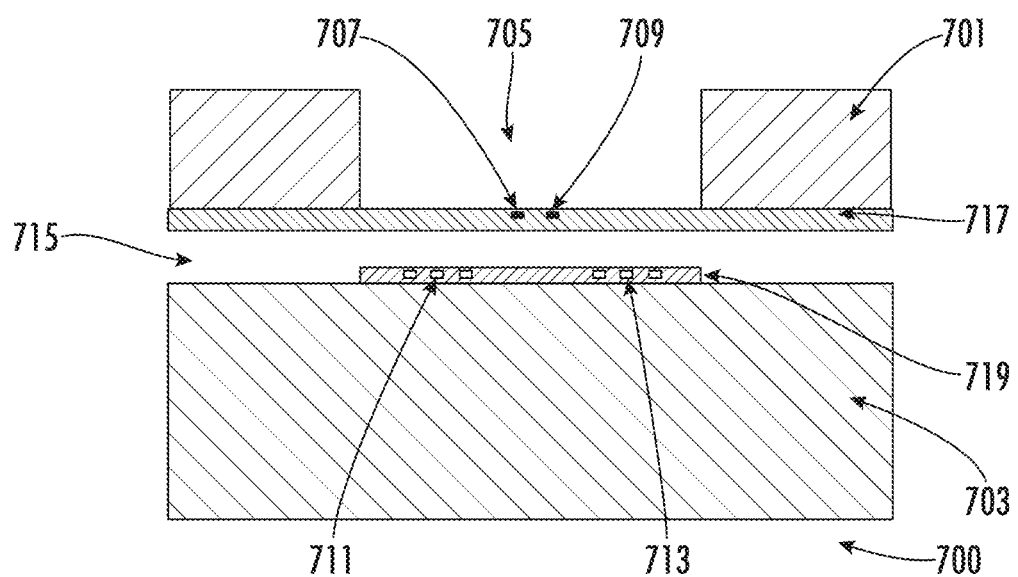
FIG. 7 illustrates an example cross sectional view of at least a portion of an example flow sensing device that is taken from, for example, a plane similar to the plane defined by the axis B-B' of FIG. 1B and viewed in a direction similar to the direction of the arrows as shown in FIG. 1B in accordance with examples of the present disclosure.

Referring now to FIG. 7, an example view of an example flow sensing device 700 in accordance with examples of the present disclosure are illustrated. In particular, FIG. 7 illustrates an example cross sectional view of at least a portion of the example flow sensing device 700. For example, the example cross sectional view of FIG. 7 may be taken from, for example, a plane similar to the plane defined by the axis B-B' of FIG. 1B relative to the flow sensing device and viewed in a direction similar to the direction of the arrows as shown in FIG. 1B. In this example, the flow sensing device 700 illustrated in FIG. 7 is shown as an alternative example to the flow sensing device 100 illustrated in FIG. 1A and FIG. 1B.

In the example shown in FIG. 7, the example flow sensing device 700 may comprise a flow cap component 701 and a sensor component 703, similar to the flow cap component 101 and the sensor component 103 described above in connection with FIG. 1A and FIG. 1B.

For example, the flow cap component 701 may comprise material such as, but not limited to, silicon, glass, polymer, and/or plastic. Additionally, or alternatively, the sensor component 703 may comprise material such as, but not limited to, silicon, glass, polymer, and/or plastic.

In some examples, the flow cap component 701 may comprise one or more heating elements, such as, but not limited to, a first heating element 707 and a second heating element 709. For example, the first heating element 707 and/or the second heating element 709 may comprise a coil, a ribbon (including but not limited to, straight ribbon, corrugated ribbon), a plate, a wire strip, and/or a layer that may be connected to an electrical power source. When the electrical power source is turned on, electric current may flow through the coil, the ribbon, the plate, the wire strip, and/or the layer, which may in turn convert electrical energy to heat energy.

In some examples, the first heating element 707 and/or the second heating element 709 may comprise nickel-based and/or iron-based material. For example, the first heating element 707 and/or the second heating element 709 may comprise nickel iron (NiFe) alloys, which may provide high temperature coefficients of electrical resistance.

While the description above provides some examples of heating elements, it is noted that the scope of the present disclosure is not limited to the description above. In some examples, an example heating element may comprise one or more additional and/or alternative element(s), one or more additional and/or alternative material(s), and/or may be in other form(s).

While the description above provides an example flow cap component that comprises two heating elements, it is noted that the scope of the present disclosure is not limited to the description above. In some examples, an example flow cap component may comprise less than two or more than two heating elements.

In the example shown in FIG. 7, the first heating element 707 and the second heating element 709 may be disposed in the first layer 717 of the flow cap component 701. In some examples, the first layer 717 of the flow cap component 701 may comprise material such as, not limited to, silicon nitride (Si3N4). Additionally, or alternatively, the first layer 717 of the flow cap component 701 may comprise other material(s), including but not limited to, silicon nitride, silicon oxide, silicon oxynitride, a polymer, or other electrically insulating thin films.

In some examples, the first heating element 707 and/or the second heating element 709 may be electronically coupled to one or more other elements (for example, an electrical power source) based on techniques such as, but not limited to, through-glass via (TGV), through-silicon via (TSV), and/or aerosol or ink jet printing. Additionally, or alternatively, the first heating element 707 and/or the second heating element 709 may be electronically coupled to one or more other elements through other means.

In some examples, the flow cap component 701 may be bonded to a first surface of the sensor component 703. For example, the flow cap component 701 may be bonded to the first surface of the sensor component 703 via an adhesive material. Additionally, or alternatively, other bonding mechanisms may be used to bond the flow cap component 701 to the sensor component 703, including but not limited to, oxide glass sealing, metal brazing, direct bonding, and/or the like. In some examples, the flow cap component 701 and the first surface of the sensor component 703 may form at least a first portion of a flow channel 715.

In some examples, the flow cap component 701 of the flow sensing device 700 may comprise a cavity portion 705. In some examples, the cavity portion 705 may be positioned on a third surface of the flow cap component 701 opposite of the second surface of the flow cap component 701. In some examples, the first heating element 707 and/or the second heating element 709 may be in contact with the cavity portion 705.

In the example shown in FIG. 7, the sensor component 703 may comprise one or more thermal sensing elements, such as, but not limited to, a first thermal sensing element 711 and a second thermal sensing element 713, similar to the first thermal sensing element 111 and the second thermal sensing element 113 described above in connection with FIG. 1A and FIG. 1B.

For example, the first thermal sensing element 711 and/or the second thermal sensing element 713 may comprise one or more thermopile element(s). In such an example, an example thermopile element may comprise one or more thermocouples connected in series or in parallel, which may detect, measure, and/or identify thermal energy, and may convert thermal energy into electrical energy and/or generate one or more electric signals based on the detected/measured/identified thermal energy.

While the description above provides some examples of thermal sensing elements, it is noted that the scope of the present disclosure is not limited to the description above. In some examples, an example thermal sensing element may comprise one or more additional and/or alternative element(s), one or more additional and/or alternative material(s), and/or may be in other form(s). For example, an example thermal sensing element may comprise at least one temperature sensing circuit, such as, but not limited to, resistors in a Wheatstone bridge circuit, or temperature sensitive diodes.

While the description above provides an example sensor component that comprises two thermal sensing elements, it is noted that the scope of the present disclosure is not limited to the description above. In some examples, an example sensor component may comprise less than two or more than two thermal sensing elements.

In the example shown in FIG. 7, the first thermal sensing element 711 and the second thermal sensing element 713 may be disposed in the second layer 719 of the sensor component 703. In some examples, the second layer 719 of the sensor component 703 may comprise material such as, not limited to, silicon nitride (Si3N4). Additionally, or alternatively, the second layer 719 of the sensor component 703 may comprise other material(s), including but not limited to, silicon nitride, silicon oxide, silicon oxynitride, a polymer, or other electrically insulating thin films. In some examples the second layer 719 may be an encapsulating layer that may protect the thermal sensing elements, which may comprise metals that may be corroded by moisture and other chemicals. In some examples, the encapsulating layer may be electrically insulating.

In some examples, the first thermal sensing element 711 and/or the second thermal sensing element 713 may be electronically coupled to one or more other elements (for example, an electrical power source, a processor) based on techniques such as, but not limited to, through-glass via (TGV), through-silicon via (TSV), and/or aerosol or ink jet printing. Additionally, or alternatively, the first thermal sensing element 711 and/or the second thermal sensing element 713 may be electronically coupled to one or more other elements through other means.

In some examples, the first layer 717 of the flow cap component 701 and the second layer 719 of the sensor component 703 may be noncoplanar. In other words, the first layer 717 of the flow cap component 701 may not occupy the same plane as the second layer 719 of the sensor component 703.

In accordance with various examples of the present disclosure, one or more plate elements may be disposed in an example sensor component of an example flow sensing device. In the present disclosure, the term "plate element" refers to a piece of material that may be in the form of a plate. In some examples, the plate elements may facilitate heat transfer from the flowing media in the flow channel to the sensing element in the sensor component. For example, at least one plate element may be disposed on a third layer of the example sensor component, and the at least one plate element may at least partially overlap with at least one thermal sensing element disposed in a second layer of the example sensor component.

Figure 8:
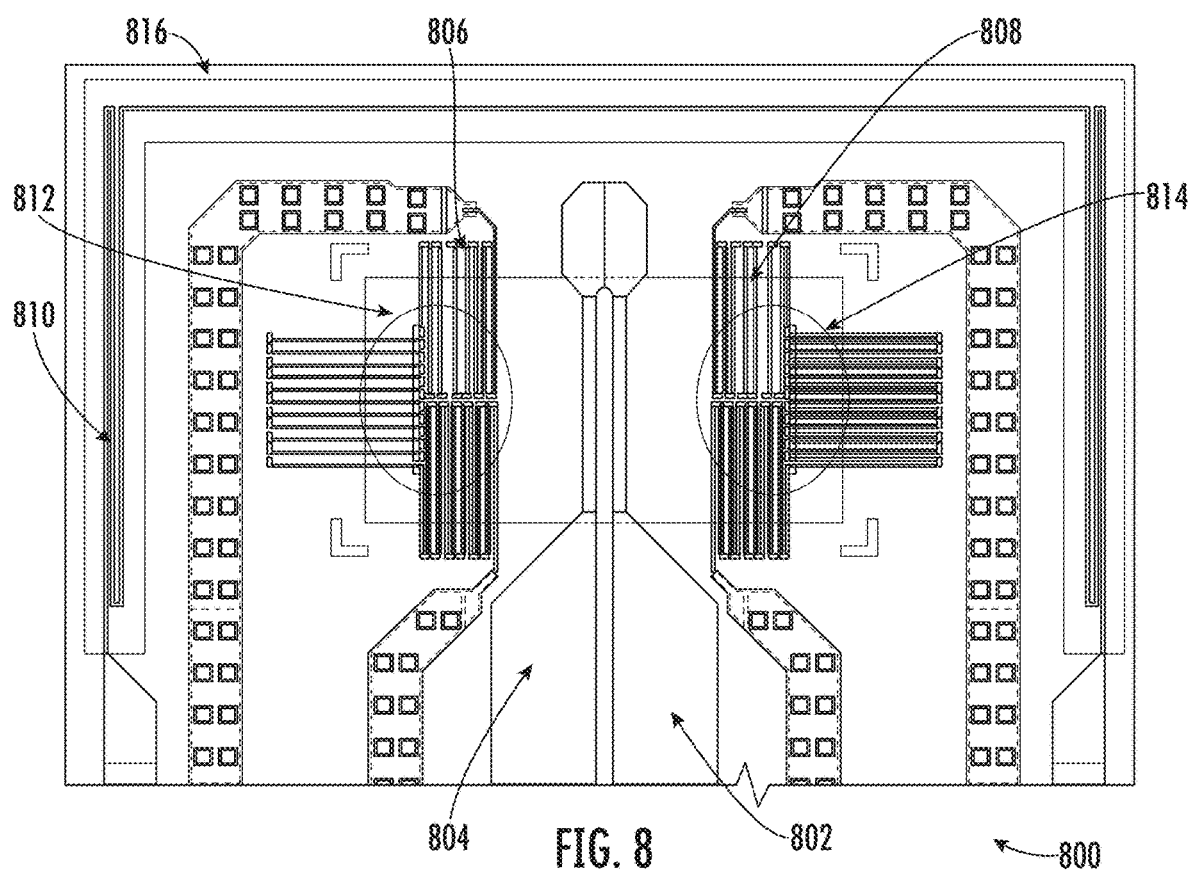
FIG. 8 illustrates an example perspective top view of at least a portion of an example flow sensing device in accordance with examples of the present disclosure.
Figure 9:
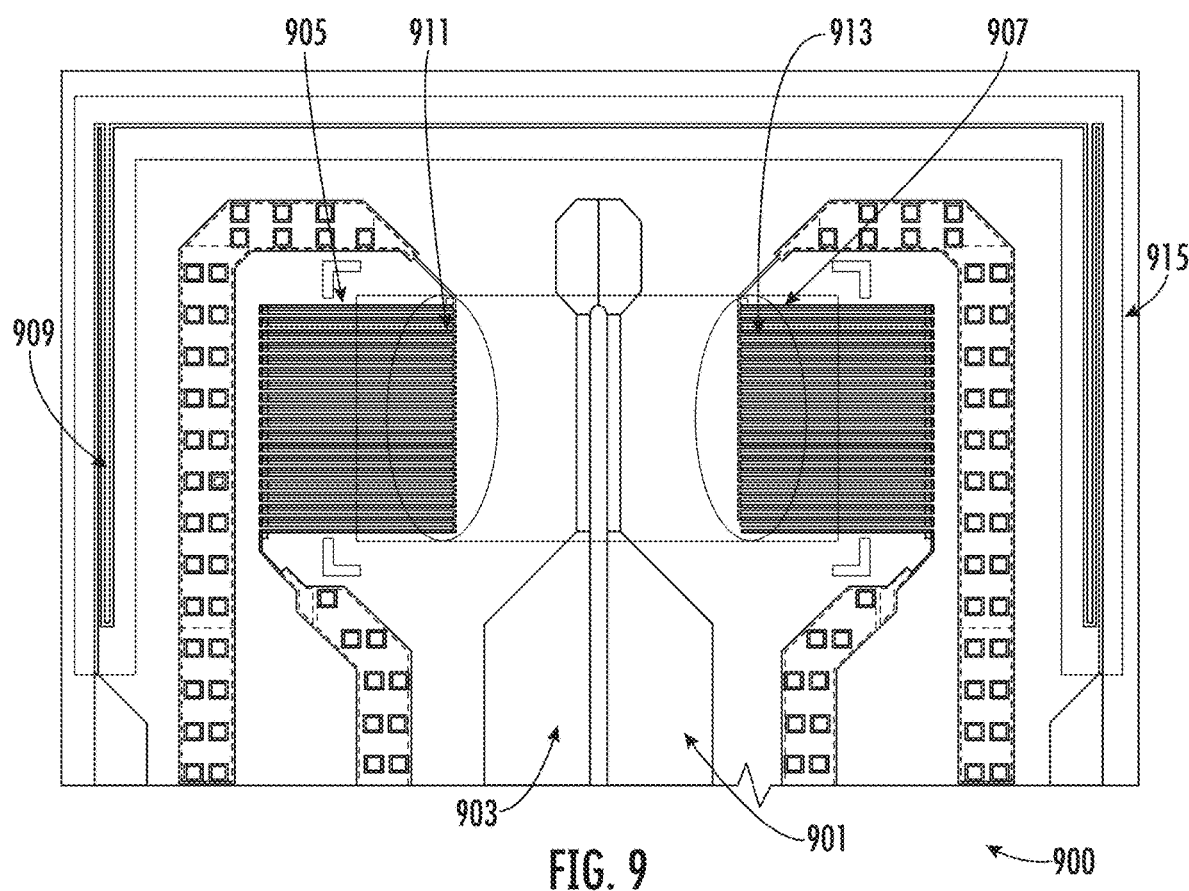
FIG. 9 illustrates an example perspective top view of at least a portion of an example flow sensing device in accordance with examples of the present disclosure.
Figure 10:
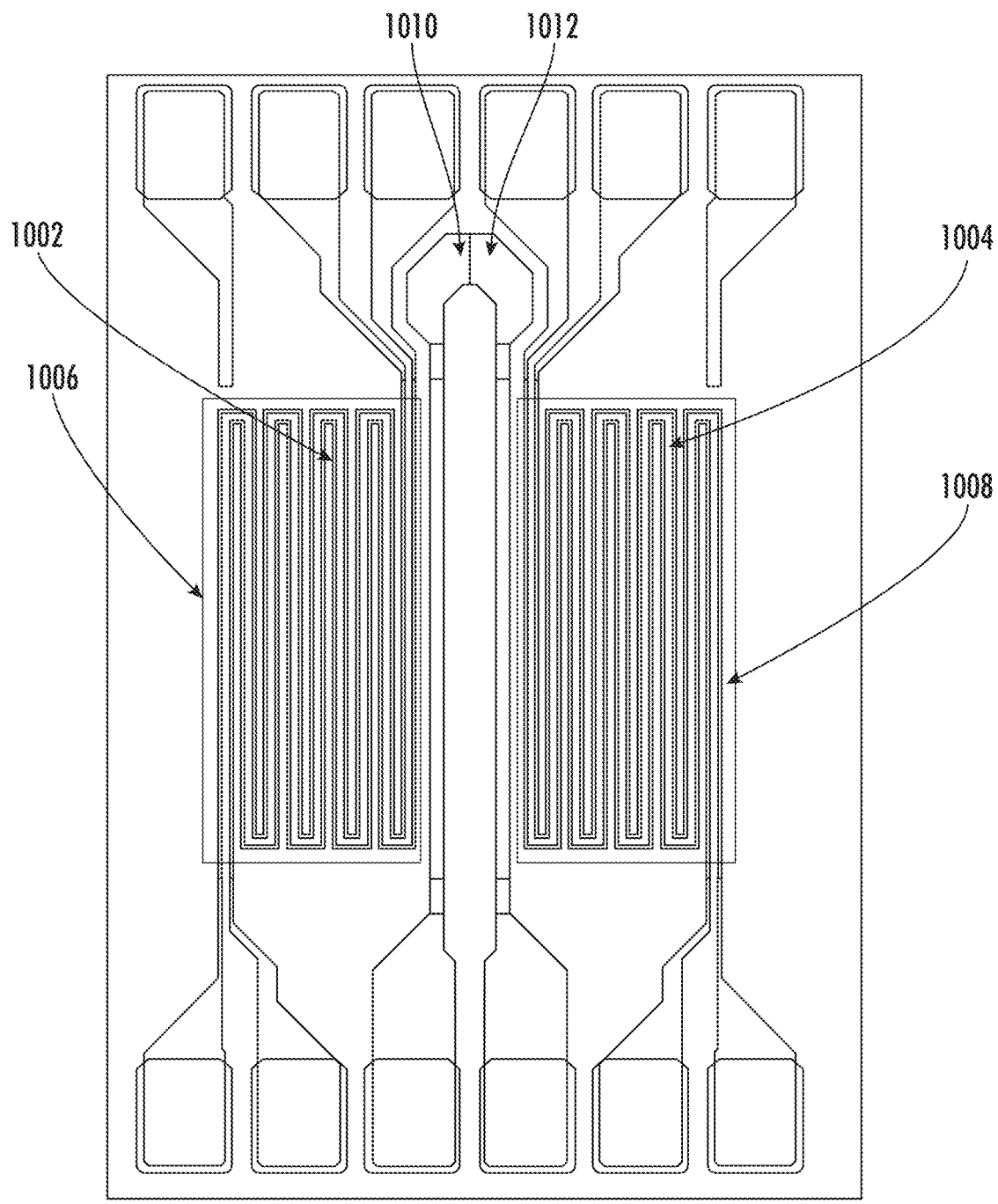
FIG. 10 illustrates an example perspective top view of at least a portion of an example flow sensing device in accordance with examples of the present disclosure.

Referring now to FIG. 8, FIG. 9, and FIG. 10, example perspective views of at least portions of example flow sensing devices are provided. It is noted that, as these are perspective views, the heating elements are shown as projections to the plane of the thermal sensing elements. For example, the heating elements 802 and 804 of FIG. 8 are shown as projections to the plane of the sensing elements. As another example, the heating elements 901 and 903 of FIG. 9 are shown as projections to the plane of the sensing elements. As another example, the heating elements 1010 and 1012 of FIG. 10 are shown as projections to the plane of the sensing elements. In other words, the heating elements and the sensing elements are noncoplanar in the example flow sensing devices.

Referring now to FIG. 8, an example perspective view of at least a portion of an example flow sensing device 800 is illustrated. In particular, FIG. 8 illustrates an example top, perspective view of at least the portion of the example flow sensing device 800 where components of the example flow sensing device 800 are projected to the same plane.

In some examples, the example flow sensing device 800 may comprise one or more heating elements disposed in the flow cap component, similar to those described above in connection with FIG. 1A and FIG. 1B. For example, the example flow sensing device 800 may comprise a first heating element 802 and a second heating element 804. In the example shown in FIG. 8, the first heating element 802 and/or the second heating element 804 may each include a metal layer that comprises nickel-based and/or iron-based material (for example, nickel iron (NiFe) alloys).

In some examples, the example flow sensing device 800 may comprise one or more thermal sensing elements disposed in the sensor component, similar to those described above in connection with FIG. 1A and FIG. 1B. For example, the thermal sensing elements of the example flow sensing device 800 may be in the form of one or more thermopiles, including a first thermopile element 806, a second thermopile element 808, and/or a resistor element 810.

As described above, one or more plate elements may be disposed in an example sensor component of an example flow sensing device. In the example shown in FIG. 8, a first plate element 812, a second plate element 814, and/or a third plate element 816 may be disposed in the example sensor component.

In some examples, the first plate element 812, the second plate element 814, and/or the third plate element 816 may only cover the thermocouples of each thermopile on the membrane of the sensor component, and not the thermocouples of the thermopile on the substrate of the sensor component. In such example, these plate elements must only reside on the membrane, and may not contact the substrate portion of the sensor component as heat will then be transferred to the substrate.

While the example shown in FIG. 8 illustrates an oval shape for the first plate element 812 and/or the second plate element 814, it is noted that the scope of the present disclosure is not limited to oval shape only. Additionally, or alternatively, the first plate element 812 and/or the second plate element 814 may be in other shapes, including squares, rectangles, and/or circles.

In some examples, the first plate element 812 may be disposed on a third layer of the example sensor component, and the first thermopile element 806 may be disposed on a second layer of the example sensor component. In some examples, electrically conducting plates (for example, the first plate element 812) may not be in intimate contact with the thermopile material (for example, the first thermopile element 806), but must have a thin film electrical insulator, such as silicon nitride, between the thermopile material and the plate material. In the example shown in FIG. 8, the first plate element 812 may at least partially overlap with the first thermopile element 806 when the first plate element 812 is projected to the plane of the first thermopile element 806.

In some examples, the first plate element 812 may comprise non-metal material that have high thermal conductivity (for example, graphene, diamond, and/or the like). In some examples, the first plate element 812 may comprise metal material (for example, aluminum, gold, and/or the like). In some examples, the first plate element 812 may be in contact with the flowing media in the flow channel, and the first plate element 812 may comprise inert material (for example, gold).

In some examples, an example sensor component may further comprise an insulator layer disposed between the first plate element 812 and the first thermopile element 806 (for example, between the second layer of the sensor component and the third layer of the sensor component). In some examples, the insulator layer may comprise material that may provide electricity insulation (for example, silicon oxide, silicon nitride, silicon oxynitride, and/or the like). As described above, the first plate element 812 may comprise metal material. As such, the insulator layer may prevent the first plate element 812 from short-circuiting the first thermopile element 806.

Referring back to FIG. 8, the second plate element 814 may be disposed on a third layer of the example sensor component, and the second thermopile element 808 may be disposed on a second layer of the example sensor component. In some examples, electrically conducting plates (for example, the second plate element 814) may not be in intimate contact with the thermopile material (for example, the second thermopile element 808), but must have a thin film electrical insulator, such as silicon nitride, between the thermopile material and the plate material. In the example shown in FIG. 8, the second plate element 814 may at least partially overlap with the second thermopile element 808 when the second plate element 814 is projected to the plane of the second thermopile element 808.

Similar to the first plate element 812 described above, in some examples, the second plate element 814 may comprise non-metal material that have high thermal conductivity (for example, graphene, diamond, and/or the like). In some examples, the second plate element 814 may comprise metal material (for example, aluminum, gold, and/or the like). In some examples, the second plate element 814 may be in contact with the flowing media in the flow channel, and the second plate element 814 may comprise inert material (for example, gold).

In some examples, an example sensor component may further comprise an insulator layer disposed between the second plate element 814 and the second thermopile element 808 (for example, between the second layer of the sensor component and the third layer of the sensor component), similar to those described above.

Referring back to FIG. 8, the third plate element 816 may be disposed on a third layer of the example sensor component, and the resistor element 810 may be disposed on a second layer of the example sensor component. In some examples, the second layer may be above the third layer. In some examples, the second layer may be below the third layer. In the example shown in FIG. 8, the third plate element 816 may at least partially overlap with the resistor element 810.

Similar to the first plate element 812 described above, in some examples, the third plate element 816 may comprise non-metal material that have high thermal conductivity (for example, graphene, diamond, and/or the like). In some examples, the third plate element 816 may comprise metal material (for example, aluminum, gold, and/or the like). In some examples, the third plate element 816 may be in contact with the flowing media in the flow channel, and the third plate element 816 may comprise inert material (for example, gold).

In some examples, an example sensor component may further comprise an insulator layer disposed between the third plate element 816 and the resistor element 810 (for example, between the second layer of the sensor component and the third layer of the sensor component), similar to those described above. In some examples, the third plate element 816 may need to be placed to overlap with the resistor lines of the resistor element 810 and not the wide lead-outs of the resistor element 810, which are the connection of the resistor element 810 to the other devices (e.g., ohm meter).

Referring now to FIG. 9, an example perspective view of at least a portion of an example flow sensing device 900 is illustrated. In particular, FIG. 9 illustrates an example top, perspective view of at least the portion of the example flow sensing device 900 where components of the example flow sensing device 900 are projected to the same plane.

In some examples, the example flow sensing device 900 may comprise one or more heating elements disposed in the flow cap component, similar to those described above in connection with FIG. 1A and FIG. 1B. For example, the example flow sensing device 900 may comprise a first heating element 901 and a second heating element 903. In the example shown in FIG. 9, the first heating element 901 and/or the second heating element 903 may each include a metal layer that comprises nickel-based and/or iron-based material (for example, nickel iron (NiFe) alloys).

In some examples, the example flow sensing device 900 may comprise one or more thermal sensing elements disposed in the sensor component, similar to those described above in connection with FIG. 1A and FIG. 1B. For example, the thermal sensing elements of the example flow sensing device 900 may be in the form of one or more thermopiles, including a first thermopile element 905, a second thermopile element 907, and/or a resistor element 909.

In some examples, the example flow sensing device 800 of FIG. 8 may produce a higher span output than the example flow sensing device 900 of FIG. 9. This is due to the number of thermopiles that can be fit onto the membrane in each configuration. The example flow sensing device 800 of FIG. 8 allows more thermopiles; thus the voltage output is higher.

As described above, one or more plate elements may be disposed in an example sensor component of an example flow sensing device. In the example shown in FIG. 9, a first plate element 911, a second plate element 913, and/or a third plate element 915 may be disposed in the example sensor component.

In some examples, the first plate element 911, the second plate element 913, and/or the third plate element 915 may only cover the thermocouples of each thermopile on the membrane of the sensor component and not the thermocouples of the thermopile on the substrate of the sensor component. In such example, these plate elements must only reside on the membrane, and may not contact the substrate portion of the die since heat will then be transferred to the substrate.

While the example shown in FIG. 9 illustrates an oval shape for the first plate element 911 and/or the second plate element 913, it is noted that the scope of the present disclosure is not limited to oval shape only. Additionally, or alternatively, the first plate element 911 and/or the second plate element 913 may be in other shapes, including squares, rectangles, and/or circles.

In some examples, the first plate element 911 may be disposed on a third layer of the example sensor component, and the first thermopile element 905 may be disposed on a second layer of the example sensor component.

In some examples, electrically conducting plates (for example, the first plate element 911) may not be in intimate contact with the thermopile material (for example, the first thermopile element 905), but must have a thin film electrical insulator, such as silicon nitride, between the thermopile material and the plate material. In the example shown in FIG. 9, the first plate element 911 may at least partially overlap with the first thermopile element 905 when the first plate element 911 is projected to the plane of the first thermopile element 905.

In some examples, the first plate element 911 may comprise non-metal material that have high thermal conductivity (for example, graphene, diamond, and/or the like). In some examples, the first plate element 911 may comprise metal material (for example, aluminum, gold, and/or the like). In some examples, the first plate element 911 may be in contact with the flowing media in the flow channel, and the first plate element 911 may comprise inert material (for example, gold).

In some examples, an example sensor component may further comprise an insulator layer disposed between the first plate element 911 and the first thermopile element 905 (for example, between the second layer of the sensor component and the third layer of the sensor component). In some examples, the insulator layer may comprise material that may provide electricity insulation (for example, silicon oxide, silicon nitride, silicon oxynitride, and/or the like). As described above, the first plate element 911 may comprise metal material. As such, the insulator layer may prevent the first plate element 911 from short-circuiting the first thermopile element 905.

Referring back to FIG. 9, the second plate element 913 may be disposed on a third layer of the example sensor component, and the second thermopile element 907 may be disposed on a second layer of the example sensor component.

In some examples, electrically conducting plates (for example, the second plate element 913) may not be in intimate contact with the thermopile material (for example, the second thermopile element 907), but must have a thin film electrical insulator, such as silicon nitride, between the thermopile material and the plate material. In the example shown in FIG. 9, the second plate element 913 may at least partially overlap with the second thermopile element 907 when the second plate element 913 is projected to the plane of the second thermopile element 907.

Similar to the first plate element 911 described above, in some examples, the second plate element 913 may comprise non-metal material that have high thermal conductivity (for example, graphene, diamond, and/or the like). In some examples, the second plate element 913 may comprise metal material (for example, aluminum, gold, and/or the like). In some examples, the second plate element 913 may be in contact with the flowing media in the flow channel, and the second plate element 913 may comprise inert material (for example, gold).

In some examples, an example sensor component may further comprise an insulator layer disposed between the second plate element 913 and the second thermopile element 907 (for example, between the second layer of the sensor component and the third layer of the sensor component), similar to those described above.

Referring back to FIG. 9, the third plate element 915 may be disposed on a third layer of the example sensor component, and the resistor element 909 may be disposed on a second layer of the example sensor component. In some examples, the second layer may be above the third layer. In some examples, the second layer may be below the third layer. In the example shown in FIG. 9, the third plate element 915 may at least partially overlap with the resistor element 909.

Similar to the first plate element 911 described above, in some examples, the third plate element 915 may comprise non-metal material that have high thermal conductivity (for example, graphene, diamond, and/or the like). In some examples, the third plate element 915 may comprise metal material (for example, aluminum, gold, and/or the like). In some examples, the third plate element 915 may be in contact with the flowing media in the flow channel, and the third plate element 915 may comprise inert material (for example, gold).

In some examples, an example sensor component may further comprise an insulator layer disposed between the third plate element 915 and the resistor element 909 (for example, between the second layer of the sensor component and the third layer of the sensor component), similar to those described above. In some examples, the third plate element 915 may need to be placed to overlap with the resistor lines of the resistor element 909 and not the wide lead-outs of the resistor element 909, which are the connection of the resistor element 909 to the other devices (e.g., ohm meter).

Referring now to FIG. 10, an example perspective view of at least a portion of an example flow sensing device 1000 is illustrated. In particular, FIG. 10 illustrates an example top, perspective view of at least the portion of the example flow sensing device 1000 where components of the example flow sensing device 1000 are projected to the same plane.

In some examples, the example flow sensing device 1000 may comprise one or more thermal sensing elements disposed within, similar to those described above in connection with FIG. 1A and FIG. 1B. For example, the thermal sensing elements of the example flow sensing device 1000 may be in the form of one or more electric circuits (for example, a full Wheatstone bridge circuit and/or a half Wheatstone bridge circuit), and may comprise one or more resistor element (for example, a first resistor element 1002 and a second resistor element 1004). In addition, the example flow sensing device 1000 may also comprise heating elements 1010 and 1012.

In some examples, the example flow sensing device 1000 according to FIG. 10 is different than the example flow sensing device 800 of FIG. 8 and the example flow sensing device 900 of FIG. 9, as the sensing elements of the example flow sensing device 1000 are resistors. In an example of the flow sensing device 1000, the entire resistor senses the temperature based on the temperature coefficient of resistance of the resistor material. In comparison, for the flow sensing device 800 and/or the flow sensing device 900, the thermocouples/thermopiles generate output based on the difference in temperature between the end of the thermocouple on the membrane and the end on the bulk substrate of the sensor component.

As described above, one or more plate elements may be disposed in an example sensor component. In the example shown in FIG. 10, a first plate element 1006 and a second plate element 1008 may be disposed in the example sensor component.

In particular, the first plate element 1006 may be disposed on a third layer of the example sensor component, and the first resistor element 1002 may be disposed on a second layer of the example sensor component. In some examples, the first plate element 1006 and/or the second plate element 1008 may cover the portions of a first resistor element 1002 and/or a second resistor element 1004 on the membrane, respectively, and not contact the bulk substrate. Otherwise, the heat may be conducted away from the resistor elements and the device may not perform properly. In the example shown in FIG. 10, the first plate element 1006 may at least partially overlap with the first resistor element 1002.

In some examples, the first plate element 1006 may comprise non-metal material that have high thermal conductivity (for example, graphene, diamond, and/or the like). In some examples, the first plate element 1006 may comprise metal material (for example, aluminum, gold, and/or the like). In some examples, the first plate element 1006 may be in contact with the flowing media in the flow channel, and the first plate element 1006 may comprise inert material (for example, gold).

In some examples, an example sensor component may further comprise an insulator layer disposed between the first plate element 1006 and the first resistor element 1002 (for example, between the second layer of the sensor component and the third layer of the sensor component). In some examples, the insulator layer may comprise material that may provide electricity insulation (for example, silicon oxide, silicon nitride, silicon oxynitride, and/or the like). As described above, the first plate element 1006 may comprise metal material. As such, the insulator layer may prevent the first plate element 1006 from short-circuiting the first resistor element 1002.

Referring back to FIG. 10, the second plate element 1008 may be disposed on a third layer of the example sensor component, and the second resistor element 1004 may be disposed on a second layer of the example sensor component. In the example shown in FIG. 10, the second plate element 1008 may at least partially overlap with the second resistor element 1004.

Similar to the first plate element 1006 described above, in some examples, the second plate element 1008 may comprise non-metal material that have high thermal conductivity (for example, graphene, diamond, and/or the like). In some examples, the second plate element 1008 may comprise metal material (for example, aluminum, gold, and/or the like).

In some examples, an example sensor component may further comprise an insulator layer disposed between the second plate element 1008 and the second resistor element 1004 (for example, between the second layer of the sensor component and the third layer of the sensor component), similar to those described above.

In some examples, various applications of present disclosure may require laminar flow, which may be characterized by particles of the flowing media following smooth path(s) in the flow channel with little or no mixing (i.e. high momentum diffusion and low momentum conviction). In contrast, turbulent flow may be characterized by particles of the flowing media undergo irregular fluctuations, or mixing. In some examples, a laminar flow for the flow sensing device may be achieved based on the flow rate of the flowing media. As described above, examples of the present disclosure may be implemented in an infusion pump, where the flow rate may be less than a flow rate threshold (for example, 5 milliliters per hour). As such, turbulent flow may be avoided by receiving a flowing media that has a flow rate below a flow rate threshold to retain the flowing media as laminar flow.

While the description above provides an example flow sensing device, it is noted that the scope of the present disclosure is not limited to the example flow sensing devices. For example, the scope of the present disclosure may encompass example methods associated with the flow sensing device.

For example, in accordance with various examples of the present disclosure a method for manufacturing a flow sensing device may be provided. The method may comprise providing a flow cap component comprising a heating element disposed in a first layer of the flow cap component and providing a sensor component comprising at least one thermal sensing element disposed in a second layer of the sensor component, similar to those described above in connection with FIG. 1A-FIG. 10. For example, the flow cap component may be formed through an etching process as described above. In some examples, the first layer and the second layer are noncoplanar, similar to those described above in connection with FIG. 1A-FIG. 10.

In some examples, the method may comprise bonding the flow cap component to a first surface of the sensor component, similar to those described above in connection with FIG. 1A-FIG. 10.

In some examples, an example flow sensing device manufactured in accordance with examples of the present disclosure may be in the form of a micro-electromechanical system (MEMS) die. For example, the flow cap component may be integral to the MEMS die. Additionally, or alternatively, the MEMS die may comprise one or more other circuitries, including, but not limited to, additional temperature sensing circuitry, communication circuitry (for example, near filed communication (NFC) circuitry), and/or power control circuitry, such that the MEMS die may be integrated a control system (for example, a control system for an infusion pump).

It is to be understood that the disclosure is not to be limited to the specific examples disclosed, and that modifications and other examples are intended to be included within the scope of the appended claims. Although specific terms are employed herein, they are used in a generic and descriptive sense only and not for purposes of limitation, unless described otherwise.

The invention claimed is:

1. A flow sensing device, comprising:
   a flow cap component comprising a heating element disposed in a first layer of the flow cap component; and a sensor component comprising at least one thermal sensing element disposed in a second layer of the sensor component, wherein the flow cap component is bonded to a first surface of the sensor component to form a flow channel, wherein the first layer and the second layer are noncoplanar and separated by the flow channel, wherein the flow cap component comprises a flow channel portion on a second surface of the flow cap component, a first opening, and a second opening, wherein the first opening and the second opening are connected to the flow channel portion on the second surface of the flow cap component, wherein the flow channel portion and the first surface of the sensor component form a first portion of the flow channel.

2. The flow sensing device of claim 1, wherein the flow cap component is configured to receive a flowing media through the first opening, wherein the flowing media travels through the flow channel and exits the flow cap component through the second opening.

3. The flow sensing device of claim 1, wherein the first portion of the flow channel comprises a plurality of sidewalls extending along a central axis of the flow channel.

4. The flow sensing device of claim 3, wherein a cross section of the first portion of the flow channel that is orthogonal to the central axis is in a rectangular shape.

5. The flow sensing device of claim 4, wherein the rectangular shape comprises at least one rounded corner or rounded edge.

6. The flow sensing device of claim 3, wherein a cross section of the first portion of the flow channel that is orthogonal to the central axis is in a triangular shape.

7. The flow sensing device of claim 3, wherein the flow channel portion of the flow cap component comprises at least one protrusion.

8. The flow sensing device of claim 1, wherein a portion of the second surface of the flow cap component is bonded to a third surface of an attachment component, wherein a fourth surface of the attachment component is bonded to a portion of the first surface of the sensor component, wherein the flow cap component, the sensor component, and the attachment component form the first portion of the flow channel.

9. The flow sensing device of claim 1, wherein the at least one thermal sensing element comprises a first thermal sensing element and a second thermal sensing element, wherein the second thermal sensing element is disposed in a downstream direction from the first thermal sensing element.

10. The flow sensing device of claim 9, further comprising a first heat sink element disposed on the first surface of the sensor component and in an upstream direction from the first thermal sensing element.

11. The flow sensing device of claim 10, further comprising a second heat sink element disposed on the first surface of the sensor component and in the downstream direction from the second thermal sensing element.

12. The flow sensing device of claim 1, wherein the flow cap component comprises a cavity portion on a third surface of the flow cap component opposite of the second surface, wherein the heating element is in contact with the cavity portion.

13. The flow sensing device of claim 1, wherein the sensor component comprises at least one plate element disposed on a third layer of the sensor component, wherein the at least one plate element at least partially overlaps with the at least one thermal sensing element.

14. The flow sensing device of claim 13, wherein the at least one thermal sensing element comprises at least one thermopile element, wherein the sensor component further comprises an insulator layer disposed between the at least one plate element and the at least one thermopile element.

15. The flow sensing device of claim 13, wherein the at least one thermal sensing element comprises at least one resistor element, wherein the sensor component further comprises an insulator layer disposed between the at least one plate element and the at least one resistor element.

16. A method for manufacturing a flow sensing device, the method comprising:

providing a flow cap component comprising a heating element disposed in a first layer of the flow cap component;

providing a sensor component comprising at least one thermal sensing element disposed in a second layer of the sensor component; and bonding the flow cap component to a first surface of the sensor component to form a flow channel, wherein the first layer and the second layer are noncoplanar and separated by the flow channel, wherein the flow cap component comprises a flow channel portion on a second surface of the flow cap component, a first opening, and a second opening, wherein the first opening and the second opening are connected to the flow channel portion on the second surface of the flow cap component, wherein the flow channel portion and the first surface of the sensor component form a first portion of the flow channel.

17. The method of claim 16, wherein the flow cap component is bonded to the first surface of the sensor component via an attachment component.

* * * * *